(12) United States Patent
Määttänen et al.

(10) Patent No.: US 12,035,189 B2
(45) Date of Patent: Jul. 9, 2024

(54) SYSTEM AND METHOD FOR FACILITATING INDEX-BASED POSITIONING IN A NON-TERRESTRIAL NETWORK

(71) Applicant: Telefonaktiebolaget LM Ericsson (publ), Stockholm (SE)

(72) Inventors: Helka-Liina Määttänen, Helsinki (FI); Björn Hofström, Linköping (SE); Sebastian Euler, Storvreta (SE); Jonas Sedin, Sollentuna (SE); Xingqin Lin, San Jose, CA (US); Olof Liberg, Stockholm (SE); Henrik Rydén, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 17/421,715

(22) PCT Filed: Jan. 7, 2020

(86) PCT No.: PCT/IB2020/050085
§ 371 (c)(1),
(2) Date: Jul. 8, 2021

(87) PCT Pub. No.: WO2020/144572
PCT Pub. Date: Jul. 16, 2020

(65) Prior Publication Data
US 2022/0086713 A1  Mar. 17, 2022

Related U.S. Application Data

(60) Provisional application No. 62/791,381, filed on Jan. 11, 2019.

(51) Int. Cl.
H04W 36/00 (2009.01)
H04B 7/185 (2006.01)

(52) U.S. Cl.
CPC . H04W 36/00837 (2018.08); H04W 36/0085 (2018.08); H04B 7/185 (2013.01)

(58) Field of Classification Search
None
See application file for complete search history.

(56) References Cited

U.S. PATENT DOCUMENTS 10,425,911 B2    9/2019  Cui et al.
2016/0323800 A1  11/2016 Ulupinar et al.
(Continued)

FOREIGN PATENT DOCUMENTS

CN    105122912 B    4/2019
WO    2018/080606 A1  5/2018

OTHER PUBLICATIONS

Chinese First Office Action for Chinese Patent Application No. 202080020328.3, dated Oct. 18, 2023, 6 pages (including English summary of Office Action).
(Continued)

Primary Examiner — Suhail Khan
(74) Attorney, Agent, or Firm — Sage Patent Group

(57) ABSTRACT

A system, method and non-transitory computer readable media for facilitating reduced signaling load with respect to UE location reporting in a non-terrestrial network (NTN) environment (100) interoperable with one or more terrestrial cellular communications networks. In one embodiment of an index-based location reporting scheme, a UE (105, 1200) may receive (402) a list of reference locations from a network node (1000, 1100), each identified with an index. Responsive to receiving the list of reference locations, the UE (105, 1200) may report to the network node (1000, 1100) an index or a subset of indices of one or more reference locations that match a specific reporting criterion. In an example implementation, reporting of index-based location information by the UE (105, 1200) may be configurably
(Continued)

triggered, e.g., periodically or in response to the occurrence of a particular event, condition, etc.

25 Claims, 11 Drawing Sheets

(56) References Cited

U.S. PATENT DOCUMENTS

2020/0077358 A1* 3/2020 Kovacs ............... H04W 64/006
2021/0250781 A1* 8/2021 Dang .................. H04B 7/0408

OTHER PUBLICATIONS

ZTE et al., "Discussion on Tracking Area Management in NTN", 3GPP TSG-RAN WG3 #101bis, R3-185610, Chengdu, China, Oct. 8-12, 2018, 6 pages.
3GPP; Technical Specification Group Radio Access Network; Solutions for NR to support non-terrestrial networks (NTN) (Release 16); 3GPP TR 38.821 V0.3.0 (Nov. 2018); 33 pages.
3GPP; Technical Specification Group Radio Access Network; Solutions for NR to support non-terrestrial networks (NTN) (Release 16); 3GPP TR 38.821 V1.0.0 (Dec. 2019); 143 pages.

* cited by examiner

SYSTEM AND METHOD FOR FACILITATING INDEX-BASED POSITIONING IN A NON-TERRESTRIAL NETWORK

PRIORITY AND CROSS-REFERENCE TO RELATED APPLICATION(S)

This application is a 371 of International Application No. PCT/IB2020/050085, filed on Jan. 7, 2020, which claims priority to U.S. Patent Application No. 62/791,381, filed on Jan. 11, 2019, the contents of which are hereby incorporated by reference in their entirety.

TECHNICAL FIELD

The present disclosure generally relates to communication networks. More particularly, and not by way of any limitation, the present disclosure is directed to a system, method, apparatus and associated computer readable media for facilitating index-based position/location reporting in a non-terrestrial network (NTN) environment.

BACKGROUND

There is an ongoing resurgence of interest in satellite communications. For example, several plans for leveraging satellite communication networks have been announced in the past few years. Potential target services vary, from backhaul and fixed wireless, to transportation, to outdoor mobile communications, and to the Internet of Things (IoT), just to name a few. It is also expected that satellite networks could complement mobile networks on the ground by providing connectivity to underserved areas as well as support for multicast/broadcast services.

To benefit from current and/or future mobile ecosystem deployments as well as concomitant economies of scale, adapting the terrestrial wireless access technologies including Long-Term Evolution (LTE) and 5G New Radio (NR) for satellite networks is drawing significant interest. For example, the $3^{rd}$ Generation Partnership Project (3GPP) recently completed an initial study in Release 15 on adapting NR to support non-terrestrial networks (mainly satellite networks). This initial study focused on the channel model for the non-terrestrial networks, defining deployment scenarios, and identifying the key potential impacts. 3GPP is also conducting a follow-up study item in Release 16 on evaluation of NR to support non-terrestrial networks including networks of communication satellites.

Whereas research efforts relative to integrating heterogeneous terrestrial networks within a non-terrestrial network environment continue to grow apace, several lacunae remain in terms of implementation, thereby requiring further innovation as will be set forth hereinbelow.

SUMMARY

The present patent disclosure is broadly directed to systems, methods, apparatuses, devices, and associated non-transitory computer-readable media for reducing signaling load with respect to user equipment (UE) location reporting in a non-terrestrial network (NTN) environment interoperable with one or more terrestrial cellular communications networks. Some example embodiments are directed to an index-based location reporting scheme wherein a UE may receive a list of reference locations from a network node, each identified with an index. Responsive to receiving the list of indexed reference locations, the UE may report to the network node an index or a subset of indices of one or more reference locations that match a specific reporting criterion. In some example embodiments, reporting of index-based location information by the UE may be configurably triggered, e.g., periodically or in response to the occurrence of a particular event, condition, etc.

In one aspect, an embodiment of a method performed by a network node disposed in an NTN communications environment is disclosed which comprises, inter alia, sending reference location information to a UE via a service link, wherein the reference location information comprises data pertaining to a plurality of indexed reference locations within one or more coverage areas of the NTN communications environment, each coverage area including a corresponding plurality of spot beam cells; and responsive to sending the reference location information, receiving from the UE a reporting message containing positioning information indicating indices of one or more reference locations that are estimated to satisfy a position conditionality relative to a current position of the UE. In one example embodiment, the method may further comprise signaling to the UE one or more report triggering criteria including at least one of: (i) an instruction to the UE to generate the reporting message periodically or in response to an event-based triggering action; (ii) a configurable timer criterion for facilitating determination of one or more time periods in between generating two successive reporting messages; and (iii) an instruction to the UE to generate the reporting message only when one or more indices are determined to be different from the indices of an immediately preceding reporting message. In another example embodiment, the method may include performing at least one of following actions by the network node responsive to receiving the reporting message from the UE, without limitation: (i) sending a handover signal (e.g., to a new spot beam cell within the same coverage area or in a coverage area of another space/airborne platform), or across a gateway to a terrestrial network, (ii) selecting one or more spot beam cells for paging the UE; (iii) updating the UE position/location data within the NTN location databases, associated terrestrial network(s), and/or other location-based service platforms, or in any combination thereof; and (iv) tracking of the UE in idle mode, e.g., depending on a particular use case scenario.

In another aspect, an embodiment of a method operating at a UE disposed in a NTN communications environment is disclosed which comprises, inter alia, receiving reference location information from a network node via a service link associated therewith, wherein the reference location information comprises data pertaining to a plurality of indexed reference locations within one or more coverage areas of the NTN communications environment, each coverage area including a corresponding plurality of spot beam cells; and responsive to receiving the reference location information, generating and transmitting a reporting message to the network node, the reporting message containing positioning information indicating indices of one or more reference locations that are estimated to satisfy a position conditionality relative to a current position of the UE. In one example embodiment, the reporting message from the UE may be triggered responsive to one or more report triggering criteria received from the network node.

In still further aspects, embodiments of a network node and a UE are disclosed, each comprising at least one processor and persistent memory having program instructions stored thereon, wherein the program instructions are configured to perform an embodiment of the methods set forth herein when executed by the respective at least one processor.

Further features of the various embodiments are as claimed in the dependent claims.

The embodiments discussed above and throughout this disclosure provide an index-based solution for facilitating efficient location reporting in NTN environments. Certain embodiments may provide one or more of the following technical advantages including, inter alia, low signaling overhead, since only a list index needs to be reported. The network can adjust the list of reference locations or configure different lists of reference locations based on the use case. For example, handover between cells are expected to require more precise location than UE paging. Thus, a list with fewer reference locations that are sparsely distributed may be used for idle mode UE mobility such as paging. Another list with more reference locations that are less sparsely distributed may be used for connected mode UE mobility such as handover. Also, in certain embodiments, the reference locations can be broadcasted, with low downlink signaling overhead. For Machine-Type Communications (MTC) UEs, for example, using only a small number of bits during signaling can enable using appropriate control messages in early-data transmission. In other words, if the bits are too many, they cannot be carried in a message of limited size as part of MTC early-data transmission procedure(s), which can be advantageously ameliorated in an embodiment of the present invention.

These and other advantages will be readily apparent to one of skill in the art in light of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
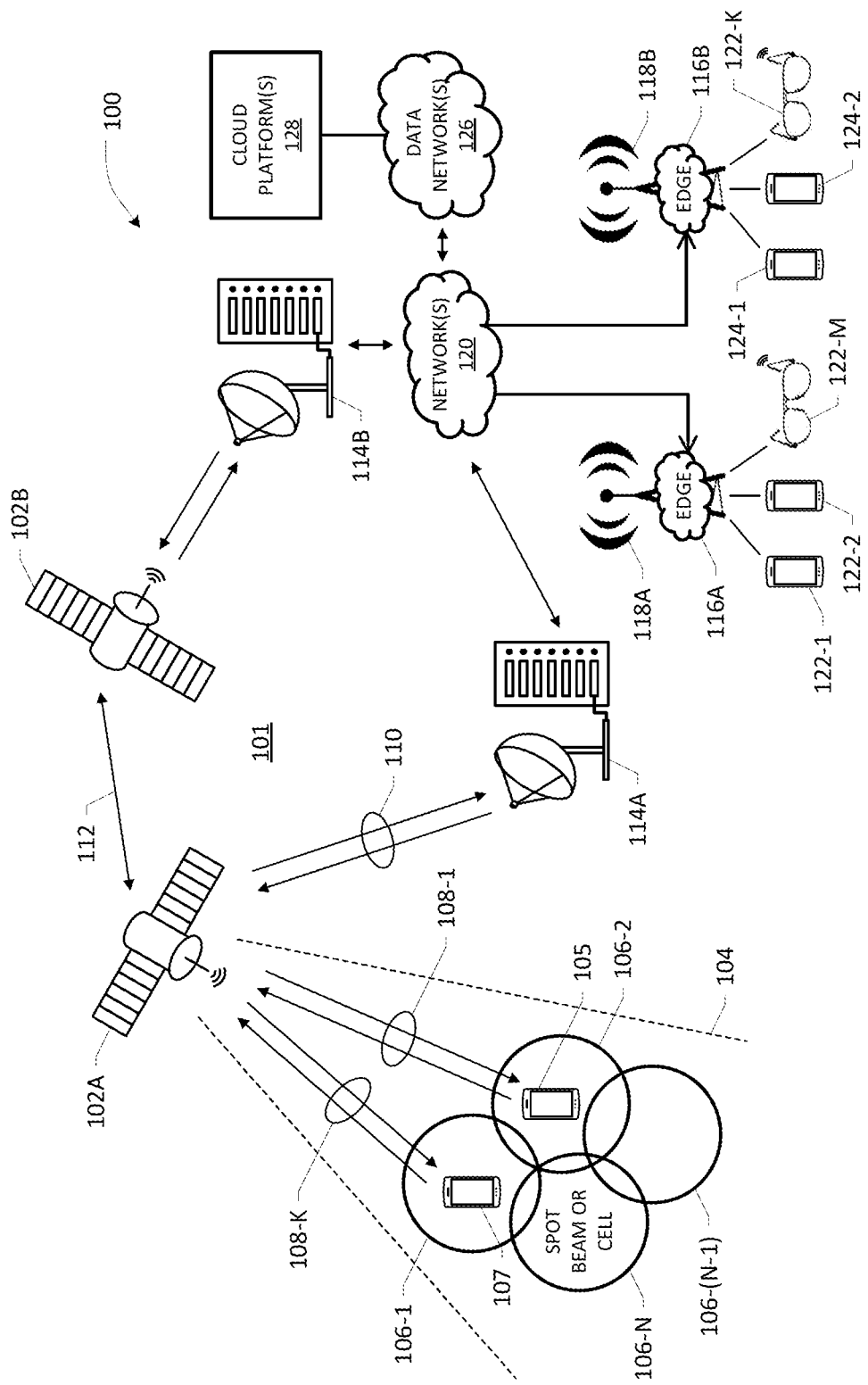
FIG. 1 depicts an example network environment including a representative non-terrestrial network (NTN) architecture wherein one or more embodiments of the present patent disclosure may be practiced in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate, mutatis mutandis. Likewise, any advantage of any of the embodiments may apply to any other embodiments, and vice versa. Other objectives, features and advantages of the enclosed embodiments will be apparent from the following description.

As used herein, a network element, platform or node may be comprised of one or more pieces of service network equipment, including hardware and software that communicatively interconnects other equipment on a network (e.g., other network elements, end stations, etc.), and is adapted to host one or more applications or services with respect to a plurality of subscriber or users, and associated client devices as well as other endpoints, each executing suitable client applications configured to consume various data/voice/media services as well as sense/collect various types of data, information, measurements, etc. As such, some network elements may be disposed in a terrestrial cellular communications network, a non-terrestrial network (e.g., a satellite telecommunications network including, inter alia, one or more communications satellites, high-altitude platform stations (HAPS)—which may be tethered or untethered, etc.), or a broadband wireline network, whereas other network elements may be disposed in a public packet-switched network infrastructure (e.g., the Internet or worldwide web, also sometimes referred to as the "cloud"), private packet-switched network infrastructures such as Intranets and enterprise networks, as well as service provider network infrastructures, any of which may span or involve a variety of access networks and core networks in a hierarchical arrangement. In still further arrangements, one or more network elements may be disposed in cloud-based platforms or data centers having suitable equipment running virtualized functions or applications relative to one or more processes set forth hereinbelow.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment, e.g., involving satellite communications. Accordingly, example UE devices may comprise various classes of devices, e.g., satellite phones or terminals, multi-mode UE terminals adapted to communicate using non-terrestrial network (NTN) communications infrastructure(s), terrestrial cellular communications infrastructure(s), or WiFi communications infrastructure(s), or any combination thereof, as well as smartphones, multimedia/video phones, mobile/wireless user equipment, portable media players, smart wearables such as smart watches, portable laptops, netbooks, palm tops, tablets, phablets, mobile phones, IoT devices and sensors, connected vehicles (manual and/or autonomous), and the like, as well as networked or local gaming devices/consoles including augmented reality (AR), virtual reality (VR) or mixed reality (MR) devices, each having at least some level of NTN communications functionalities in some example implementations.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present patent disclosure.

Referring to the drawings and more particularly to FIG. 1, depicted therein is an example network environment 100 including a representative NTN architecture wherein one or more embodiments of the present patent disclosure may be practiced in accordance with the teachings herein. By way of illustration, NTN architecture is exemplified as a satellite communications network 101 comprising one or more communications satellites 102A, 102B and associated gateway nodes 114A, 114B, which may be coupled to one or more terrestrial networks (TNs) 120 comprising any type or combination of packet-switched networks, circuit-switched networks, landline communications networks, mobile cellular communications networks, etc., based on known or heretofore unknown communication technologies, which in turn may be connected to or otherwise configured to support one or more data networks 126 operative to effectuate suitable platforms 128 for datacenter services, expert systems and/or Big Data analytics services, cloud-based services, virtualization services (e.g., Network Function Virtualization (NFV)), and the like. Skilled artisans will also recognize upon reference hereto that some example embodiments of the present patent disclosure may be practiced in an NTN architecture involving equipment other than satellites, such as, e.g., one or more airborne or spaceborne vehicles configured for communications including but not limited to high-altitude platform stations (HAPS), low-altitude platform stations (LAPS), either of which can be tethered or untethered, unmanned aircraft systems (UAS), unmanned aerial vehicles (UAV) or drones, and the like, which may operate at various altitudes lower than typical satellite altitude deployments, depending on implementation, spectrum allocation, service coverage, etc. Further, where mobile cellular or wireless communications networks are deployed in association with a representative NTN architecture, such networks may comprise infrastructure selected from at least one of a Global System for Mobile Communications (GSM) radio access network (GRAN) infrastructure, an Enhanced Data Rates for Global System for Mobile Communications (GSM) Evolution (EDGE) network (GERAN) infrastructure, a 3$^{rd}$/4$^{th}$/5$^{th}$ Generation Partnership Project (3/4/5GPP) network infrastructure (including 5G New Radio or NR), an Integrated Digital Enhanced Network (IDEN) infrastructure, a WiMAX infrastructure, a heterogeneous access network (HAN) infrastructure, a Code Division Multiple Access (CDMA) network infrastructure, a Universal Mobile Telecommunications System (UMTS) network infrastructure, a Universal Terrestrial Radio Access Network (UTRAN) infrastructure, an All-IP Next Generation Network (NGN) infrastructure, a Long Term Evolution (LTE) infrastructure, one or more types of the Institute of Electrical and Electronics Engineers (IEEE) 802.11 class WiFi communications infrastructure, a HiperLAN infrastructure, a HiperMAN infrastructure, and the like. Given the diversity and heterogeneity of such networks, pluralities of users or UE devices 122-1 to 122-M and 124-1 to 124-K may therefore be serviced in respective coverage areas that may include a plurality of macrocells, microcells, small cells, femtocells, picocells, etc. (collectively referred to as "terrestrial network cells", "mobile communications network cells", or terms of similar import unless otherwise specified). By way of example, edge networks 116A, 116B and associated network nodes 118A, 118B (e.g., eNodeB or eNB in LTE, Next Generation NB or gNB in 5G NR, etc.) are also illustrated in FIG. 1 with respect to the overall network environment 100. Accordingly, although various heterogeneous radio network environments and/or other terrestrial communications networks may be deployed in association with a representative NTN architecture, example embodiments will be set forth below in further detail, without limitation, in reference to a satellite-based NTN that may coupled to or otherwise integrated with a 5G NR technology or network via one or more suitable gateways.

For purposes of some representative embodiments, satellites 102A, 102B may comprise any type of communications satellite or satellites orbiting over the earth's surface that may be configured in or more constellations to provide global, national, supra-national, or regional coverage for a plurality of subscribers with respect to one or more services including but not limited to satellite communications (SATCOM) (e.g., voice, data, text, video, and/or internet), land mobile satellite services, maritime mobile satellite services, as well as multimedia broadcast services, navigation services, global positioning, etc. Depending on implementation, satellites 102A, 102B may be deployed at different altitudes in various orbits around the earth to facilitate service coverage over varying geographic areas. In some representative embodiments, satellites 102A, 102B may be disposed in a geosynchronous or geostationary earth orbit (GSO or GEO) at an altitude of 35,786 km from the earth's surface having an orbital period of 24 hours. An advantage of such an orbital deployment is that ground station antennas, e.g., antenna associated with gateway 114A, do not have to track the satellites across the sky. Instead, the ground station antenna 114A may be fixed to point at the location in the sky where the satellite 102A appears. In another example embodiment, satellites 102A, 102B may be disposed in a medium earth orbit (MEO) that is closer to the earth's surface, with typical orbital altitudes ranging from around 2,000 km to about 36,000 km and having corresponding orbital periods of about 2-14 hours. In further representative embodiments, satellites 102A, 102B may be disposed in still closer orbits, e.g., in a low earth orbit (LEO) having an altitude ranging from about 150 km to around 1,500 km, with orbital periods of 90-130 minutes. In still further embodiments, satellites 102A, 102B may be disposed in specialized orbits, e.g., highly elliptical orbits (HEO) such as Molniya orbits, Tundra orbits, etc., where elliptic orbits with a high degree of eccentricity relative to the earth may be used.

It should be appreciated that satellites 102A, 102B orbit the earth faster while disposed in MEO or LEO arrangements and therefore do not remain visible in the sky to an earth-bound fixed point (e.g., a satellite service user or a ground station) continually in the manner they would have if disposed in a GEO arrangement. Instead, satellites 102A, 102B appear to a ground observer to cross the sky and "set" when they go behind the earth's surface (i.e., the horizon) in such orbital arrangements. To provide continuous communications capability, accordingly, a larger number of satellites 102A, 102B may be required in LEO/MEO arrangements such that at least one satellite 102A, 102B is always a visible (i.e., having an unobstructed line of sight) for effectuating transmission/reception of communication signals (i.e., control signals and/or user data signals) with respect to one or more users having suitable UE devices or terminals, e.g., UE 105, 107, and/or associated ground station elements such as, e.g., gateways 114A, 114B.

Example spaceborne/airborne platforms, e.g., satellites 102A, 102B, may include appropriate spacecraft-based equipment and interconnect architecture for facilitating various aspects of satellite operation, e.g., power, thermal control, altitude control, etc., as well as communications payload, e.g., one or more antennas and one or more transponders. In some embodiments, satellites 102A, 102B may therefore comprise any communications satellite having one or more transponders operating in a wide range of radio and microwave frequencies to relay the communications signals around the earth's curvature allowing communications between widely separated geographical locations or areas. To avoid signal interference and/or optimize spectrum utilization, the satellite communications may be effectuated in a number of frequency bands using suitable protocols, including 3GPP protocols (i.e., 5G NR) in some implementations where such protocols are extended, modified or otherwise integrated to cover the NTN infrastructure at least for purposes of some example embodiments as will be set forth in detail further below. Regardless of whether non-3GPP radio protocols or 3GPP radio protocols are utilized in effectuating NTN communications, a representative space/airborne platform, e.g., satellite 102A, may be configured to generate one or more beams depending on the type and number of on-board transponders, over a given geographical area, referred to as a footprint or service coverage area of the satellite. Where multiple beams are generated in a service coverage area, the footprint of each beam (also sometimes referred to as a spot beam) covers a ground area that is usually elliptical in shape, which may be logically considered as a satellite cell or spot beam cell, somewhat analogous to—but distinct from—a cell in a terrestrial cellular communications network. The footprint of a spot beam (hence the overall service coverage area) may move across the earth's surface corresponding to the movement of the satellite in some deployments. In other arrangements, the footprint may be earth-fixed, with certain beam pointing techniques and mechanisms on-board the satellite that may be configured to compensate for the satellite's motion.

In general, the distance of a satellite orbit from the earth has an inverse relationship with signal strength and a positive relationship with the service coverage area or footprint of a satellite. As such, the size of a spot beam depends on the system design and orbital deployment, wherein a spot beam cell size or coverage may range from tens of kilometers to a few thousands of kilometers. It should be appreciated that the coverage of a GEO satellite can be quite large but static, requiring only infrequent updates of spot beam pointing directions to compensate for the GEO satellite movement in order to have the same spot beam cover the same geographical area. On the other hand, the movements of non-GEO satellites, especially LEO satellites, lead to a varying coverage in time and space. For example, a typical LEO satellite is visible to a ground UE terminal for a few minutes only, implying that even in a LEO satellite communications system with earth fixed beams (where each LEO satellite constantly updates its beam pointing directions to serve a certain geographical area), the serving satellites may change every few minutes. In a LEO satellite communications system with moving beams, a typical spot beam with a radius of tens of kilometers can cover a UE for only a few seconds. The varying coverage in time and space can therefore have implications for UE mobility management methods when adapting 5G NR for non-GEO satellite communications, which may require positioning updates even more frequently in some embodiments as will be set forth in detail further below.

By way of illustration, satellite 102A is operative to serve a coverage area 104 that may comprise a plurality of spot beam cells 106-1 to 106-N, overlapping or otherwise, wherein one or more users with corresponding UE terminals 105, 107 may be disposed in one or more cells. For purposes of facilitating NTN communications, one or more transponders of satellite 102A may be configured to effectuate one or more service links (also referred to as access links) 108-1 to 108-K on the UE side between satellite 102A and respective UE terminals 105, 107, and one or more feeder links 110 on the gateway side, e.g., between satellite 102A and gateway node 114A. In some embodiments, satellite 102A may also include an interface to effectuate one or more inter-satellite links, e.g., ISL 112, with one or more other satellites, e.g., 102B, that may or may not be part of the same constellation, NTN operator network or service provider network. Where other spaceborne or airborne communications platforms are deployed, e.g., HAPS, such inter-platform links may be referred to as inter-aerial links (IAL). Although not specifically shown in example network environment 100 of FIG. 1, a representative satellite coverage area, e.g., coverage area 104, may in some deployments overlap one or more terrestrial cellular communications networks, e.g., Public Land Mobile Networks (PLMNs) operating with different radio access technologies (RATs) as well as additional network elements, e.g., one or more maritime/airborne platforms (e.g., on-board aircraft or marine vessels). Further, in some example arrangements, UE terminals 105, 107 may not be able to communicate directly with a terrestrial communications network infrastructure within the satellite coverage area 104 or outside of it because of poor terrestrial cellular connectivity (although the UE terminals may have appropriate hardware/software/firmware functionality) and/or due to the lack of the requisite terrestrial cellular functionality altogether (e.g., UE terminals 105, 107 operating as satellite phones only).

With respect to satellite communications, an example NTN deployment may involve using one set of frequencies or bands for effectuating one or more access links with the UE terminals whereas a different set of frequencies or bands may be used for effectuating suitable feeder links with the gateway nodes. Because of multi-spot beaming, different satellite cells serving different UE terminals may use or reuse same frequencies without signal interference across the access links. Further, each access link, e.g., access link 108-1, may comprise an uplink (UL) or channel for communicating control and/or user data from the UE terminal 105 to the serving space/airborne platform 102A and a downlink (DL) or channel for communicating control and/or user data from the space/airborne platform 102A to the UE terminal 105, wherein the uplink may be referred to as an access/service uplink (AUL or SUL) and the downlink may be referred to as an access or service downlink (ADL or SDL), each effectuated in appropriate frequency bands (e.g., in the same or different frequency bands). In similar fashion, a gateway feeder link (e.g., feeder link 100) may comprise an uplink (UL) or channel for communicating control and/or user data emanating from a terrestrial network relative to one or more satellite service users to the space/airborne platform 112A via gateway 114A and a downlink (DL) or channel for communicating control and/or user data from the space/airborne platform 102A to gateway 114A, wherein the uplink may be referred to as a feeder uplink (FUL) and the downlink may be referred to as a feeder downlink (FDL). Depending on implementation and/or NTN-TN integration, FULs and FDLs may be effectuated in suitable frequency bands and appropriate technologies (e.g., in the same or different frequency bands). With respect to round-trip communications between a UE terminal (e.g., UE terminal 105) and a serving gateway functionality (e.g., gateway 114A), a communication link from gateway 114A to UE terminal 105 may sometimes be referred to as a forward link or path, whereas a communication link from UE terminal 105 to gateway 114A may sometimes be referred to a return link.

Figure 2B:
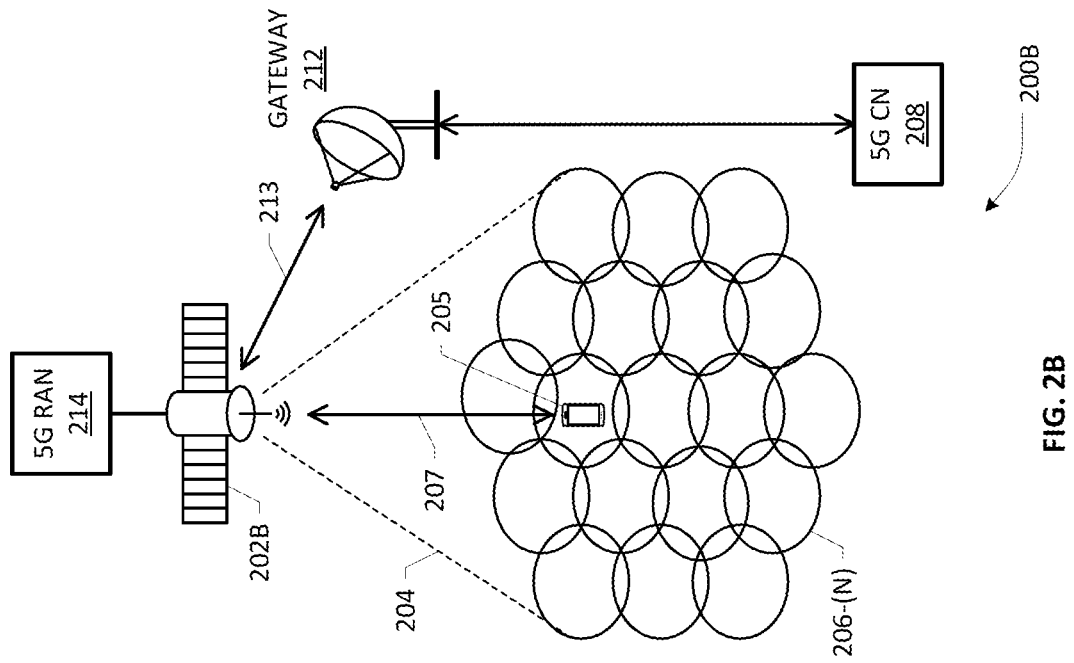
FIGS. 2A and 2B depict examples of a representative NTN architecture operative with a terrestrial 5G infrastructure for purposes an embodiment of the present patent disclosure.
Figure 2A:
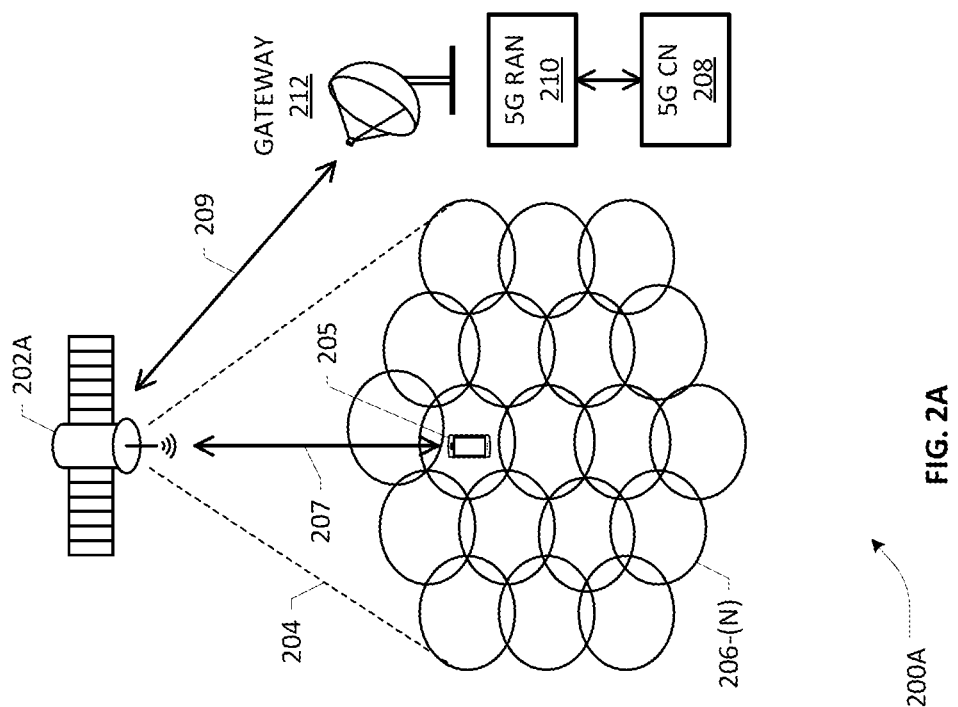

Further, depending upon the functionality of the communication payload of a space/airborne platform, e.g., satellite 102A, one of two different types of transponder arrangements may be implemented in an example embodiment. FIGS. 2A and 2B depict examples of a representative NTN architecture operative with a terrestrial 5G infrastructure for purposes of an embodiment of the present patent disclosure. Example arrangement 200A of FIG. 2A represents a bent pipe transponder configuration (also referred to as a transparent transponder configuration), wherein a space/airborne platform, e.g., satellite or HAPS 202A, may be provided with a transponder (or a group of transponders corresponding to a multi-spot beam technology) that transparently forwards a received signal via an uplink (e.g., AUL or FUL) back to the earth (e.g., via ADL or FDL) with only amplification and a frequency conversion or shift from the UL frequency to a DL frequency. As illustrated, coverage area 204 may comprise a plurality of satellite cells 206(N) wherein a UE 205 is operative to communicate with satellite/HAPS 202A via an access link 207, which is illustrated as a bidirectional link to indicate both UL and DL functionalities effectuated over a suitable first frequency ($F_1$), e.g., comprising a 5G NR frequency band. A feeder link 209 is disposed between satellite 202A and a gateway 212 coupled to a 5G radio access network (RAN) infrastructure 210, e.g., including one or more gNB nodes, which in turn is coupled to a 5G core network 208. Feeder link 209 is also illustrated as a bidirectional link to indicate both UL and DL capabilities with respect to gateway 212 over a suitable second frequency ($F_2$), e.g., a 5G NR frequency band. In this configuration, any interworking functionality required with respect to communications between the NTN and TN infrastructures (e.g., relative to UE terminal 207) may be effectuated at the ground station, i.e., gateway 212, which may sometimes be co-located or otherwise integrated with a 5G gNB node disposed in the RAN.

Alternatively, arrangement 200B shown in FIG. 2B exemplifies a nontransparent or regenerative transponder configuration where satellite/HAPS 202B includes on-board processing to demodulate (i.e., demodulation of RF carrier to baseband) and decode a received signal (via an AUL or FUL) and regenerate the signal before transmitting it back to the earth (via an ADL or FDL). In an example implementation involving 5G NR, accordingly, a 5G RAN functionality 214, e.g., gNB functionality, may be provided on-board satellite/HAPS 202B. As before, access link 207 associated with UE terminal 207 is illustrated as a bidirectional link to signify both UL and DL capabilities effectuated over the first frequency ($F_1$), e.g., a 5G NR frequency band. On the other hand, feeder link 213 disposed between satellite/HAPS 202B and gateway 212 is operative to implement a 3GPP-specific interface, 5G $NG_C/NG_U$ interface, over the second frequency ($F_2$), e.g., 5G NR frequency band. In this arrangement, gateway 212 may therefore directly connect to the 5G core network 208.

Integration of an NTN architecture with suitable terrestrial 3GPP access technologies and networks (collectively referred to herein as "TN infrastructure") may be implemented in an example embodiment as set forth above in concordance with applicable standards and specifications, e.g., 3GPP TR 38.811, 3GPP TR 38.821, 3GPP TR 22.822, 3GPP TS 24.301, inter alia, incorporated by reference herein. Whereas several benefits are expected to be realized in such an integrated network environment as noted elsewhere in the present patent disclosure, technical problems remain with respect to certain physical phenomena that affect NTN communications that can negatively impact the overall network performance, thereby reducing potential impetus for launching new services involving or aiming to leverage NTN-TN integration. As will be seen below, such issues can be advantageously ameliorated by reducing control signal loading associated with transmission of UE terminal position/location information on NTN communication links (e.g., access/feeder links) in accordance with the teachings set forth herein.

Set forth in the following passages is a discussion in order to further contextualize example embodiments of the present patent disclosure within a 5G NR framework. In some NTN-TN implementations, two main physical phenomena that can affect design considerations are: (i) long propagation delay; and (ii) Doppler effects that are associated with communications involving space/airborne platforms. It should be appreciated that the Doppler effects can be especially pronounced for LEO satellites. Skilled artisans will further recognize that propagation delay is a main physical phenomenon in a satellite communications system that makes the design different from that of a terrestrial mobile cellular communications system. For a bent pipe transponder configuration, e.g., NTN arrangement 200A shown in FIG. 2A, one or more of the following delays are relevant, inter alia: (i) one-way delay from the RAN node (e.g., BS/eNB/gNB node) to the UE terminal via the satellite, or the other way around; (ii) round-trip delay from the RAN node to the UE terminal via the satellite and from the UE terminal back to the RAN node via the satellite; and (iii) differential delay comprising the delay difference of two selected points in the same spot beam or cell. It should also be noted that there may be additional delay between the ground station/RAN antenna and RAN node, which may or may not be co-located. Typically, this additional delay depends on deployment and if the additional delay cannot be ignored, it should be taken into account in the communications system design.

As such, propagation delays depend on the length of a signal path, which further depends on the elevation angles of the satellite/HAPS seen by the gateway/RAN node and UE terminal on the ground. In one example implementation, the minimum elevation angle is typically more than 10° for a UE terminal and more than 5° for the gateway/RAN node on the ground. In one arrangement, a delay analysis may assume the foregoing values in the design of an example NTN-TN implementation. Set forth below are Tables 1 and 2 excerpted from 3GPP TR 38.811 that illustrate certain delay estimates:

TABLE 1

Propagation delays for GEO satellite at 35,786 km
(extracted from Table 5.3.2.1-1 in 3GPP TR 38.811)

| | | GEO at 35786 km | |
| --- | --- | --- | --- |
| Elevation angle | Path | D (km) | Time (ms) |
| UE: 10° | satellite-UE | 40586 | 135.286 |
| GW: 5° | satellite-gateway | 41126.6 | 137.088 |
| 90° | satellite-UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite-UE | 40586 | 135.286 |
| Round Trip Time | Satellite-UE-Satellite | 81172 | 270.572 |

TABLE 2

Propagation delays for NGSO satellites
(extracted from Table 5.3.4.1-1 in 3GPP TR 38.811)

| | | LEO at 600 km | | LEO at 1500 km | | MEO at 10000 km | |
| --- | --- | --- | --- | --- | --- | --- | --- |
| Elevation angle | Path | Distance D (km) | Delay (ms) | Distance D (km) | Delay (ms) | Distance D (km) | Delay (ms) |
| UE: 10° | satellite-UE | 1932.24 | 6,440 | 3647.5 | 12.158 | 14018.16 | 46.727 |
| GW: 5° | satellite-gateway | 2329.01 | 7.763 | 4101.6 | 13.672 | 14539.4 | 48.464 |
| 90° | satellite-UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |

TABLE 2-continued

Propagation delays for NGSO satellites
(extracted from Table 5.3.4.1-1 in 3GPP TR 38.811)

| Elevation angle | Path | LEO at 600 km | | LEO at 1500 km | | MEO at 10000 km | |
|---|---|---|---|---|---|---|---|
| | | Distance D (km) | Delay (ms) | Distance D (km) | Delay (ms) | Distance D (km) | Delay (ms) |
| Round Trip Delay | Twice | 8522.5 | 28.408 | 15498.4 | 51.661 | 57115.2 | 190.38 |
| | | | | Regenerative satellite | | | |
| One way delay | Satellite - UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

It can be seen that that the round-trip delay is much larger in certain satellite systems. For example, it is about 545 ms for a GEO satellite system. In contrast, the round-trip time is normally no more than 1 ms for typical terrestrial cellular networks. Generally, within spot beam covering one cell, the delay can be divided into a common delay component and a differential delay component. The common delay is the same for all UE terminals in the cell and may be determined with respect to a reference point in the spot beam. In contrast, the differential delay may be different for different UE terminals, which depends on the propagation delay between the reference point and the point at which a given UE terminal is positioned within the spot beam.

The differential delay is mainly due to the different path lengths of the access links, since the feeder link is normally the same for terminals in the same spot beam. Further, the differential delay is mainly determined by the size of the spot beam, which may range from sub-millisecond (for a spot beam on the order of tens of kilometers) to tens of milliseconds (for a spot beam on the order of thousands of kilometers).

As previously set forth above, satellites or aerial vehicles typically generate several beams over a given area, wherein the footprint of the beams may typically comprise an elliptical shape having ground coverage areas that may have the same or different sizes. Further, the beam footprint may be moving over the earth's surface consistent with the satellite or the aerial vehicle motion in its orbit. Alternatively, the beam footprint may be earth fixed, in which case some beam pointing mechanisms (e.g., mechanical or electronic steering feature) may be implemented that may be configured to compensate for the satellite or the aerial vehicle motion as previously noted. Typical beam footprint sizes for GEO satellites may be in on the order of 200-1000 km, whereas non-GEO satellites may have beam footprint sizes in the range of 100-500 km. Typical HAPS or aerial vehicles may on the other hand have even smaller footprints, e.g., around 5-200 km.

Depending on whether GEO or non-GEO satellite constellations are utilized in an example NTN-TN implementation, following architectural considerations may be taken into account in a system design: (i) one or several satellite gateways that connect the NTN to a terrestrial network including e.g., a public data network; (ii) a GEO satellite may be fed by one or several satellite gateways that may be deployed across the satellite targeted coverage (e.g., regional or even continental or intercontinental coverage), with the assumption that UE(s) in a cell are served by only one gateway; and (iii) a non-GEO satellite served successively by one gateway at a time, wherein the system can be configured to ensure service and feeder link continuity between the successive serving gateways with sufficient time duration to proceed with mobility anchoring and handover.

Further, depending on whether transparent or bent pipe transponder configurations are implemented in an embodiment, four reference example implementation scenarios are possible as set forth in the below Table:

TABLE 3

Reference scenarios (extracted from Table 4.2-1 in 3GPP TR 38.821)

| | Transparent satellite | Regenerative satellite |
|---|---|---|
| GEO based non-terrestrial access network | Scenario A | Scenario B |
| LEO based non-terrestrial access network | Scenario C | Scenario D |

Parametric information relating to the foregoing reference scenarios is set forth in the Table below:

TABLE 4

Reference scenarios (extracted from Table 4.2-2 in 3GPP TR 38.821)

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | Circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |

TABLE 4-continued

Reference scenarios (extracted from Table 4.2-2 in 3GPP TR 38.821)

| Scenarios | GEO based non-terrestrial access network (Scenario A and B) | LEO based non-terrestrial access network (Scenario C & D) |
|---|---|---|
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms (transparent payload: service and feeder links)<br>Scenario D: 12.88 ms (regenerative payload: service link only) |
| Max delay variation within a beam (earth fixed user equipment) | 16 ms | 4.44 ms (600 km)<br>6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train)<br>Possibly 1000 km/h (e.g. aircraft) |
| User equipment antenna types | Omnidirectional antenna (linear polarization), assuming 0 dBi<br>Directive antenna (up to 60 cm equivalent aperture diameter in circular polarization) | |
| User equipment Tx power | Omnidirectional antenna: UE power class 3 with up to 200 mW<br>Directive antenna: up to 4 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

Some of the design constraints used with respect to the foregoing reference scenarios are as follows. First, each satellite has the capability to steer beams towards fixed points on earth using beamforming techniques. This is applicable for a period of time corresponding to the visibility time of the satellite. Second, maximum delay variation within a beam (for earth-fixed UE terminal) is calculated based on a minimum elevation angle for both gateway and UE terminal. Third, maximum differential delay within a beam is calculated based on a maximum beam footprint diameter at nadir.

For reference scenario D, which is LEO with regenerative payload, both earth-fixed and earth-moving beams may be separately considered. Accordingly, by factoring in the fixed/non-fixed beams, two sub-scenarios may be obtained for reference scenario D, with the a complete list of five scenarios consistent with 3GPP TR 38.821 as follows: Scenario A—GEO, transparent satellite, Earth-fixed beams; Scenario B—GEO, regenerative satellite, Earth fixed beams; Scenario C—LEO, transparent satellite, Earth-moving beams; Scenario D1—LEO, regenerative satellite, Earth-fixed beams; and Scenario D2—LEO, regenerative satellite, Earth-moving beams.

In each of foregoing reference scenarios, it should be noted that providing UE terminal position information to an NTN functionality or node (e.g., on-board the space/air-borne platform or deployed in association with a ground station or GW node) as efficiently as possible is highly desirable because such an implementation would reduce the control signaling load on the NTN communication links, thereby minimizing the signaling costs and resource consumption typically associated with transmitting exact terminal location data (e.g., GPS geolocation data) as noted elsewhere in the of the present patent disclosure.

Turning attention to FIGS. 3A-3B and 4A-4B, depicted therein are flowcharts of various blocks, steps and/or acts that may be (re)combined in one or more arrangements, with or without additional flowcharts of the present disclosure, for effectuating index-based positioning and location reporting with respect to one or more UE terminals in an NTN environment according to one or more embodiments of the present patent disclosure. Broadly, embodiments are directed to an index-based location reporting scheme wherein a UE terminal may receive a list of geolocations from a network node, also referred to as reference locations, each identified with an index, indicium, key, sign, mark, alphanumerical character, or some unique identifier, and the like, that facilitates location representation in a highly compact manner, and the UE terminal may report to the network node an index or a subset of indices of one or more reference locations that match a specific reporting criterion. In one example implementation, the network node (e.g., an NTN node or functionality) may broadcast or unicast a list of reference locations via one or more ADL channels, and the UE terminal may report via a suitable AUL channel one or more indices of geolocations that are closest to the UE terminal's current position in a footprint or coverage area.

Figure 3A:
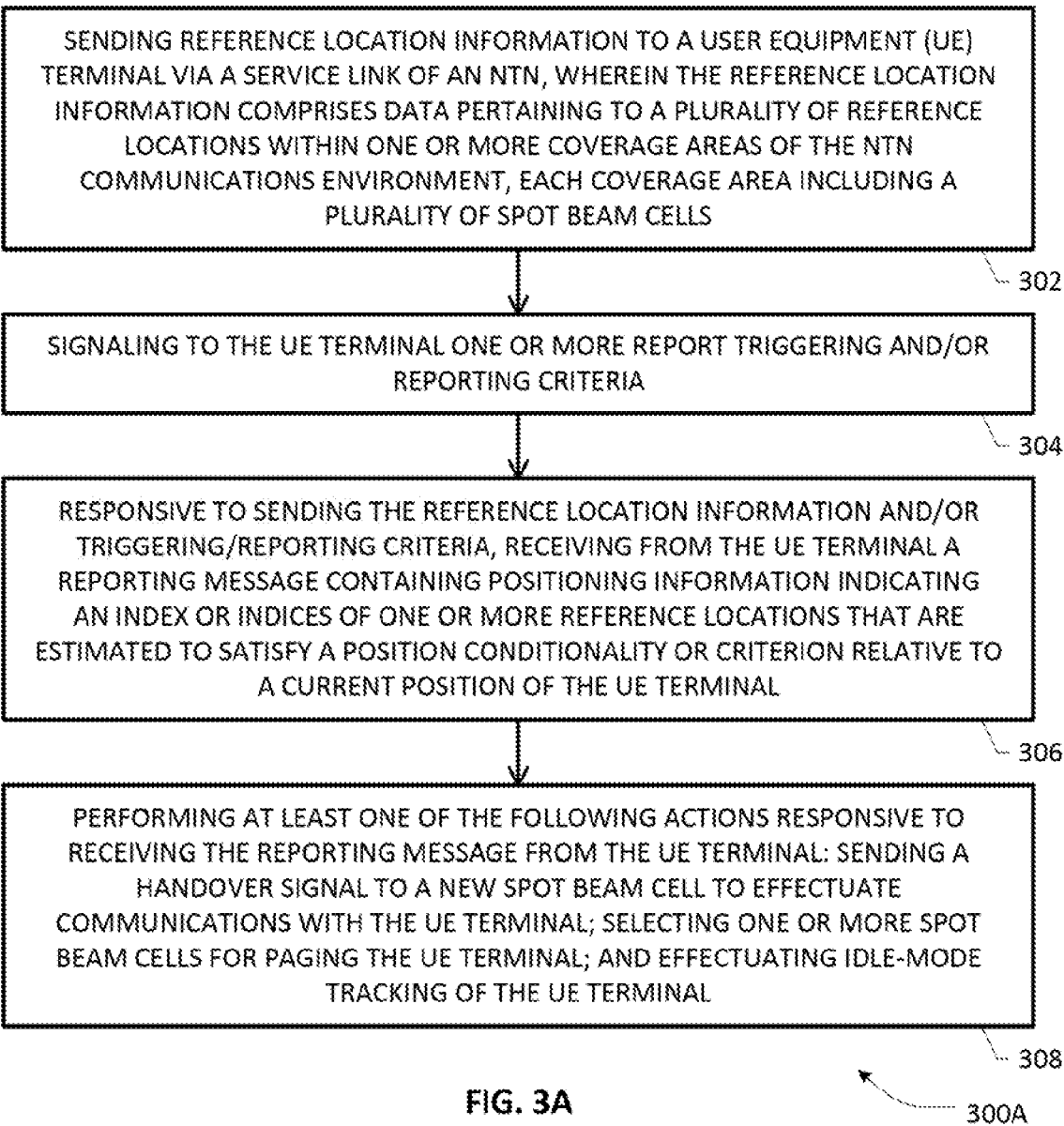
FIGS. 3A-3B and 4A-4B depict flowcharts of various blocks, steps and/or acts that may be (re)combined in one or more arrangements, with or without additional flowcharts of the present disclosure, for effectuating index-based positioning and location reporting with respect to one or more user equipment (UE) devices or terminals in an NTN environment according to one or more embodiments of the present patent disclosure.
Figure 3B:
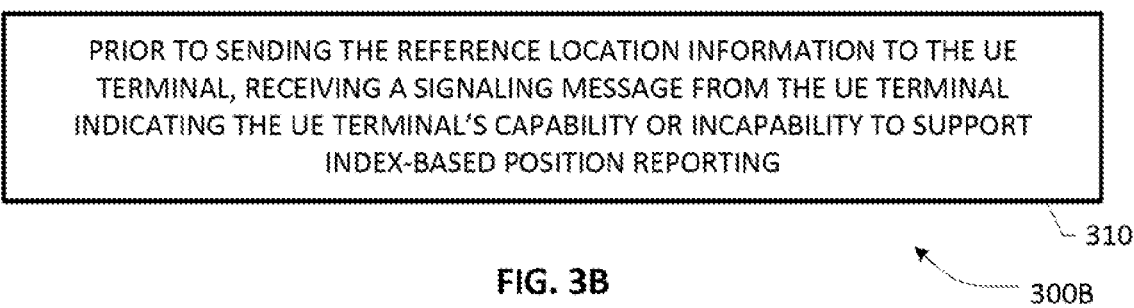

Processes 300A and 300B set forth in FIGS. 3A and 3B generally comprise steps, acts, blocks, and/or operations that may be effectuated at a network node or functionality disposed in an NTN communications environment for facilitating at least some aspects of the foregoing scheme in an example embodiment. At block 302, reference location information may be transmitted to a UE terminal via a service/access link of an NTN, wherein the reference location information comprises data pertaining to a plurality of reference locations within one or more coverage areas of the NTN communications environment, each coverage area including a corresponding plurality of spot beam cells. Depending on implementation and applicable 3GPP radio protocols (e.g., 5G NR), a suitable signaling channel of the service/access link may be used in transmitting the indexed reference location data, either in a separate control message or via a repurposed, extended, or otherwise modified existing control message. In one embodiment, a physical downlink control channel (PDCCH) message may be used for unicast transmission of the reference location data. In another embodiment involving broadcast transmission, the reference location data may be provided via a physical broadcast channel (PBCH) message. Where multiple UE terminals are being serviced in the NTN environment, the network node may be configured to assemble different lists of indexed reference locations depending on available intelligence with respect to each UE terminal, and may use appropriate frequencies and timeslots in accordance with the applicable control channel signaling standards for effectuating ADL transmission(s) to the UE terminals without causing interference. In such a scenario, for example, appropriate service logic may be configured at the network node to transmit the lists in different DL frequency ranges where the UE terminals may be disposed in different cell layouts (e.g., a 2.0 GHz cell layout versus a 20.0 GHz cell layout).

In addition, depending on a particular use case scenario, a network node may assemble indexed reference location data for some UE terminals that is more dense or granular (e.g., with respect to UE terminals requiring/having more accurate report location capabilities based on such as, e.g., Global Navigation Satellite System (GNSS) including the NAVSTAR Global Positioning system (GPS), collectively GPS/GNSS). Further, the network node may also transmit or signal to the UE terminal(s) one or more report triggering and/or reporting criteria as set forth at block 304. In some arrangements, the triggering/reporting criteria signaling may be transmitted in the same message containing the indexed reference location data signaling. In some alternative arrangements, such triggering/reporting criteria may be transmitted via a separate message. Responsive to sending the reference location information and/or triggering/reporting criteria, the network node receives from the UE terminal a reporting message containing positioning information indicating an index or indices of one or more reference locations that are estimated to satisfy a position conditionality or criterion relative to a current position of the UE terminal (block 306). Further, the network node may be configured to perform, in some example embodiments optionally, one or more actions responsive to receiving the reporting message from the UE terminal. By way of illustration, such actions may include but are not limited to: (i) sending a handover signal (e.g., to a new spot beam cell within the same coverage area or in a coverage area of another space/airborne platform, which can be mediated by way of suitable ISL/IAL message(s)), or across an NTN-TN gateway to other network nodes disposed in the network environment, to continue and/or effectuate/commence communications with the UE; (ii) selecting one or more spot beam cells for paging the UE; (iii) updating the UE position within the NTN location databases and/or associated terrestrial network(s) or other location-based service platforms; and (iv) tracking of the UE in idle mode, inter alia, as set forth at block 308. Depending on a particular use case scenario, some of the foregoing actions may therefore comprise inter-NTN, intra-NTN, and/or NTN-TN actions.

In some embodiments, the network node may optionally receive a signaling message from the UE terminal prior to sending the reference location information to the UE terminal. For example, such messaging may be received from the UE terminals as part of its initial access/registration with the NTN node indicating the UE terminal's capability or incapability to support index-based position/location reporting as set forth block 310 of process 300B. Depending on the capabilities and/or protocol compatibility of the UE terminal, an initial capability message emanating from the UE terminal via suitable AUL/SUL channel signaling may be suitably modified to indicate such index-based position reporting capability using only a minimum number of bits. For example, just one extra bit may be needed in a simple implementation scenario in an otherwise already required initial capabilities message, which causes significantly less signaling load than transmitting/receiving the exact geolocation data (e.g., using GPS/GNSS) that requires at least 128 bits (for two double-precision floating point numbers) plus overhead bits.

Figures 4A, 4B:
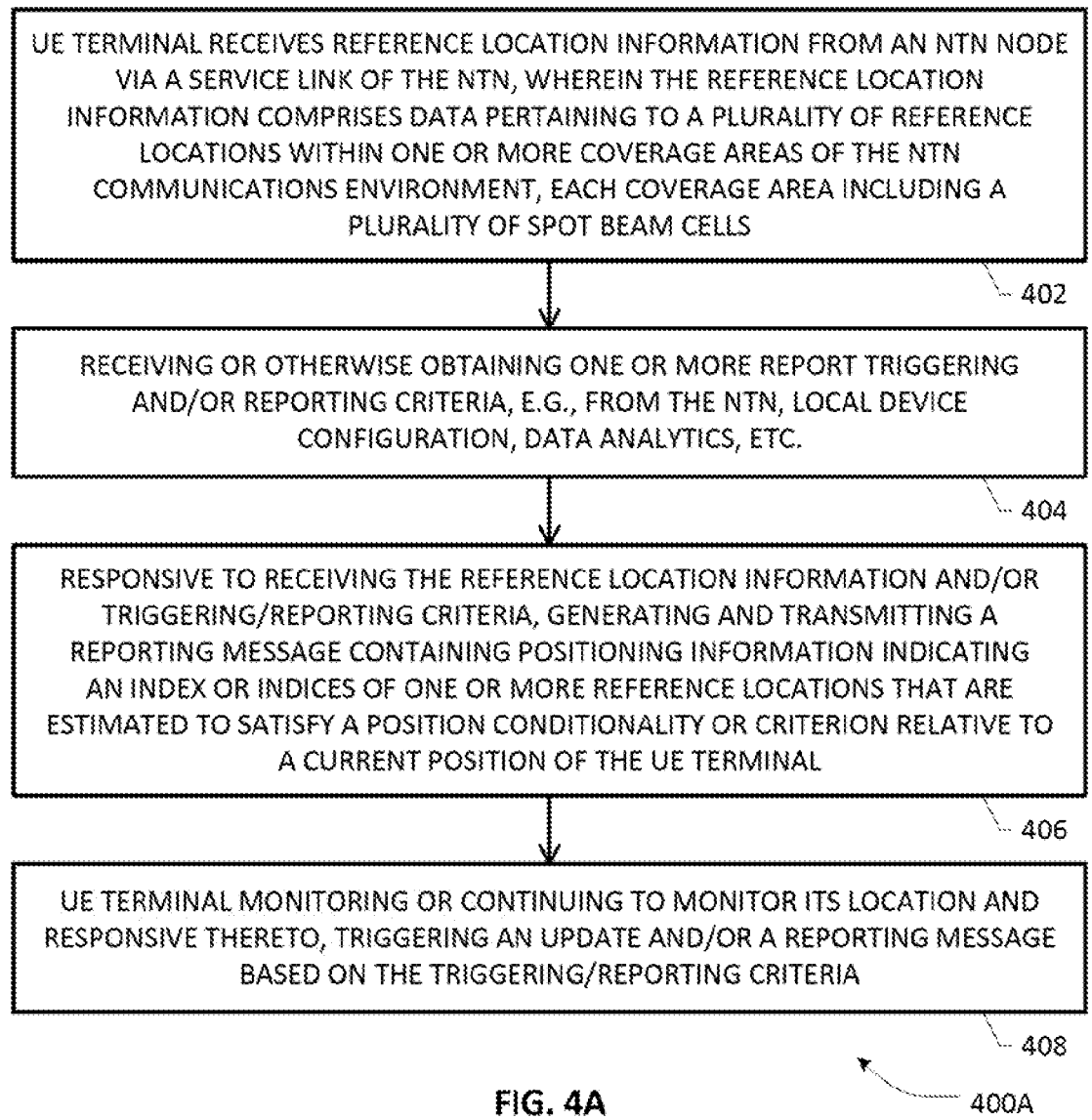

Processes 400A and 400B set forth in FIGS. 4A and 4B generally comprise steps, acts, functions, blocks and/or operations that may be effectuated at a UE terminal disposed in an NTN communications environment for facilitating at least some UE-based aspects of an example embodiment. Corresponding to the network-based processes set forth above, indexed reference location information may be received by a UE terminal via a service/access link of the NTN, wherein the reference location information comprises data pertaining to a plurality of reference locations within one or more coverage areas of the NTN communications environment, each coverage area including a corresponding plurality of spot beam cells (block 402). It should be appreciated that the indexed reference location information may pertain to locations associated with one or more spot beam cells (i.e., satellite cells) that may or may not be part of the same NTN operator network, satellite constellation, etc. In some example embodiments, the reference locations may comprise locations across national borders or even continents. In some additional and/or alternative embodiments, the indexed reference location information may also pertain to locations associated with one or more tracking areas, one or more PLMN coverage areas (e.g., terrestrial cells), various types of macrocells, microcells, small cells, femtocells, picocells, remote radio units or radio heads (RRU or RRH), etc. of any overlapping heterogeneous radio networks, and the like. As noted previously, such reference location information may be received via applicable DL signaling channels via broadcast or unicast transmission. At block 404, the UE terminal receives or otherwise obtains one or more report triggering and/or reporting criteria, e.g., from the NTN, pursuant to stored local device configuration, by way of third-party networks and/or responsive to external data analytics, etc. Responsive to receiving the reference location information and/or triggering/reporting criteria, the UE terminal generates and transmits a reporting message via a suitable UL control channel containing positioning information indicating an index or indices of one or more reference locations that are estimated or otherwise determined to satisfy a position conditionality or criterion relative to a current position of the UE terminal (block 406). In one embodiment, the UE terminal may monitor or continue to monitor its location and responsive thereto, may trigger an update and/or cause a reporting message based on the triggering/reporting criteria, as set forth at block 408.

In another embodiment, prior to receiving the reference location information from the network node, the UE terminal may optionally transmit a signaling message as part of its initial access/registration with the NTN node indicating the UE terminal's capability or incapability to support index-based position/location reporting as set forth block 410 of process 400B. As previously noted, such additional control messaging does not require a significant signaling load while advantageously obviating the need for transmitting the exact geolocation data (e.g., using GPS/GNSS).

Skilled artisans will recognize upon hereto that depending on particular use case scenarios, how geolocation data relating to reference locations is obtained/represented, UE terminal capabilities (e.g., whether GPS/GNSS supported, whether capable of index-based location reporting, etc.), and the like, several aspects of the foregoing scheme may be (re)arranged, modified, and/or further adapted into a number of variations for purposes of the present patent disclosures. Set forth below are further details with respect to one or more such additional and/or alternative embodiments, each of which potentially giving rise to a reduction in the signaling load between a network node and one or more UE terminals for efficient location and/or measurement reporting in an illustrative scenario.

As noted previously, an example UE terminal may be configured to signal its capabilities regarding index-based reporting. Also, an example UE terminal may be configured to include its location estimation capabilities in some embodiments, e.g., with respect to the UE terminal's current position, future locations predicted based on an estimated travel/trajectory and speed (if based in a user vehicle or disposed in association with an autonomous vehicle, etc.) and the like. It should be appreciated that such location estimation capabilities depend on the device configuration. For example, high-end UEs equipped with GPS/GNSS receivers can signal higher location estimation accuracy capabilities than cheaper devices without GPS/GNSS receivers. With respect to providing an initial list of indexed reference locations, a network node may be configured to assemble, determine, receive, predict, estimate or otherwise obtain such location information based on a number of techniques, mechanisms, etc. In general, such techniques may range from relatively simple implementations (e.g., based on a UE terminal's last known position in a coverage area and selecting a predetermined number of reference locations within a configurable geographical region relative to that last known position) to more advanced processes aided by device tracking and/or location prediction techniques involving Big Data analytics, artificial intelligence (AI)-based expert systems, pattern recognition, machine learning, deep dive profile analysis involving user's social media, travel habits, mode of travel patterns, and the like, e.g., effectuated by service operator platforms, network operator platforms and/or third-party platforms such as platform 128 shown in FIG. 1, to obtain a more targeted list of reference locations with respect to where the UE might be located. In some further embodiments, a network node may also engage in control communications with other NTN infrastructure elements, terrestrial networks, etc. to obtain and/or supplement the reference location data relative to a UE device. Depending on whether the network node functionality resides on-board a satellite/HAPS, or in a ground station (e.g., a gateway node), or virtualized, different levels of intelligence may be configured for determining a list of reference locations for a UE. Accordingly, at least in some embodiments, the reference locations for a UE may be obtained, received, determined, or otherwise acquired by a network node based upon at least one or more of: (i) the UE's last known position; (ii) an estimated travel direction and estimated speed of travel associated with the UE; (iii) a geographic boundary condition within which the plurality of reference locations are to be limited; (iv) signaling loads on one or more service links associated with the network node; (v) one or more inter-NTN signals received from another network node relative to the UE's estimated geolocation; and (v) one or more inputs from an intelligent data analytics system associated with the network node configured to estimate the UE's geolocation based on third-party data. Since on-board processing resources may be relatively limited in some implementations, one example embodiment may therefore include less complex location determination/estimation capabilities.

In one example implementation, the network node may be configured to transmit the reference locations via broadcasting as noted above, for example by configuring a new System Information Block (SIB) or extending one or more existing SIB(s) in NR. In an implementation involving group-common multicast signaling, the network node or functionality may be configured to assemble the reference locations for a configured group of one or more devices based on the group UE capabilities. For example, if the UE(s) in the group is(are) equipped with accurate location estimation capabilities, the network can configure a list of more densely distributed reference locations, thereby improving the granularity of the reported/transmitted location estimation. Likewise, in an implementation involving unicast signaling, the network can specifically configure the reference locations for a UE terminal based on the UE capabilities. Accordingly, if the UE is equipped with accurate location estimation capabilities, the network can configure a list of more densely distributed reference locations targeted for that UE terminal, whereby the granularity of the reported location estimation can be improved in a similar manner.

An example NTN node can also be configured in another embodiment to set or otherwise determine a list of reference locations based on the use case. For example, UE paging requires less accurate UE location in comparison to UE handover between satellite cells. In general, the density of the reference locations (e.g., how many locations to transmit in a list, or how geographically proximate the locations are with respect to one another) is a trade-off between UE location reporting granularity and signaling overhead. It should be appreciated that higher density of the reference locations in a list requires more signaling due to potentially longer list of reference locations that may be reported back via index-based reporting and more frequent triggering of UE location update reporting.

Depending on implementation, earth-bound reference locations may be provided as absolute locations or relative locations, which may be represented in a number of ways, e.g., pairs of latitude and longitude data in reference to a suitable coordinate grid, earth-centered, earth-fixed (ECEF) geographic points represented as $\{x,y,z\}$ coordinates, and the like. Where reference locations may involve an altitude component (e.g., in reference to space/airborne platforms relative to an airborne UE terminal or a terrestrial UE terminal), the latitude/longitude pairs may be augmented with an altitude coordinate as well. Likewise, ECEF data may be modified to account for the altitude component such that the $\{x,y,z\}$ points may refer to locations in the space above the earth. In some example embodiments, ECEF data may be converted to ephemeris data or vice versa with respect to the reference locations. Regardless of how the reference locations are represented, they may be indexed or otherwise uniquely identified with appropriate markers as previously noted. By way of example, a plurality of indexed reference locations may be provided as below:

$Ind(1)=\{Lat(1);Long(1)\};$ $Ind(2)=\{Lat(2);Long(2)\};$

.

.

.

$Ind(n)=\{Lat(n);Long(n)\},$ where each index Ind(i) can be any identifier or indicium that is encoded to facilitate a compact notation of the corresponding location information.

Figure 5:
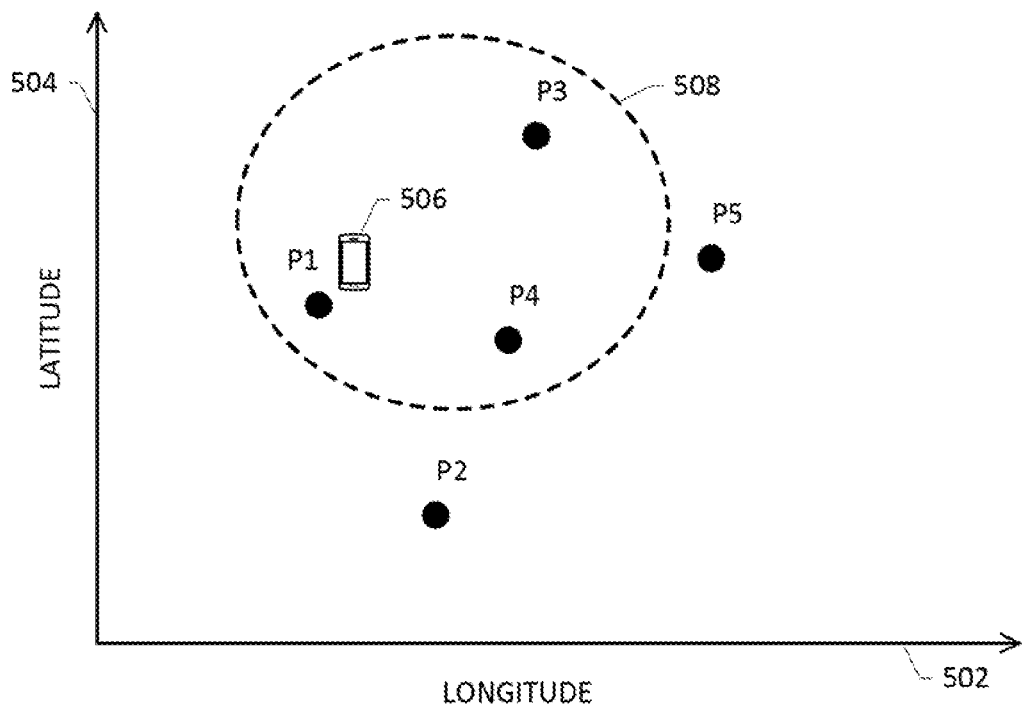
FIGS. 5-8 depict examples of representations of reference location information that may be transmitted by a network element to a UE disposed in an NTN environment for purposes an embodiment of the present patent disclosure.

FIGS. 5-8 depict examples of representations of reference location information that may be transmitted by a network element or functionality to a UE terminal disposed in an NTN environment for purposes an embodiment of the present patent disclosure. In FIG. 5, a set of five reference locations {P1, P2, P3, P4, P5} are exemplified in a representation 500 where each reference location is identified relative to UE 506 and coded for example using a longitude and latitude pair in a Cartesian coordinate grid spanned by a longitude coordinate 502 and a latitude coordinate 504. Although not shown in this FIG., an altitude coordinate may also be implemented (optionally) in a further variation as previously noted. In one embodiment, an example reporting criterion for the UE 506 may comprise a position conditionality relative to its current position. If the position conditionality requires the UE terminal 506 to report the index of a reference location that is closest to the UE terminal 506, the reported index in a location report/update may be {P1}. On the other hand, if the position conditionality requires the UE terminal 506 to report one or more indices corresponding to the reference locations that are within a certain distance ($D_{TH}$) or area 508 from its current position, the UE terminal 506 may report a subset of the indices, e.g., comprising {P1, P3, P4}, in its location report.

Figure 6:
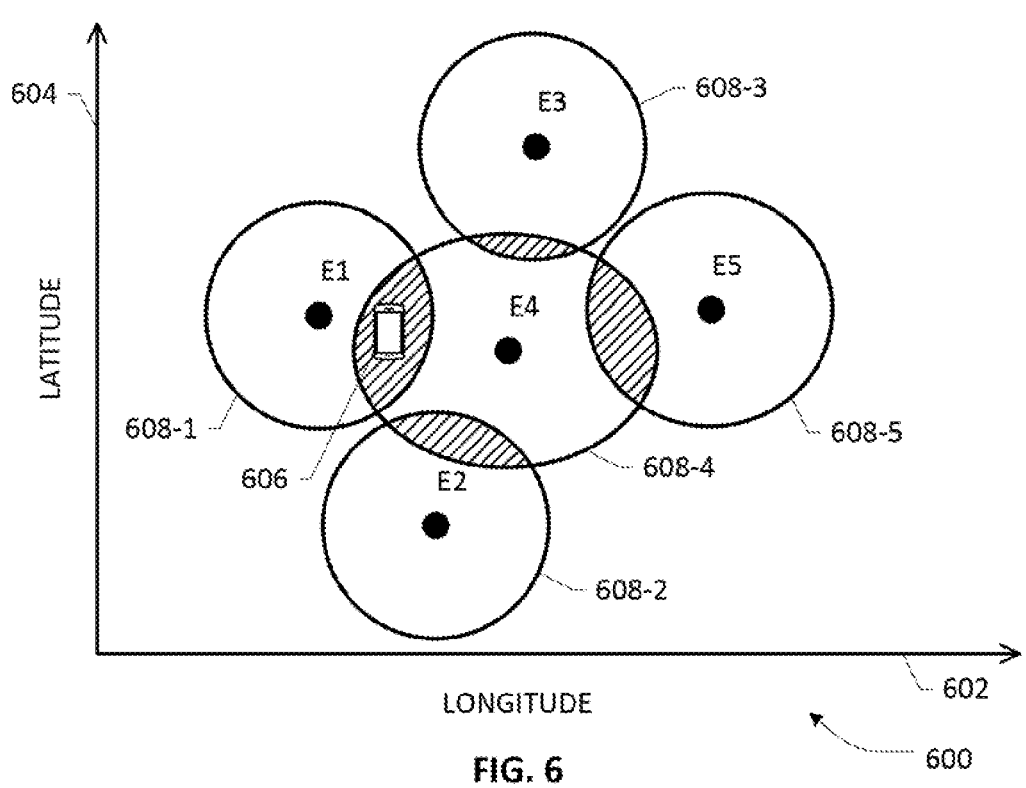

In a further embodiment, the reference location information may comprise ellipsoid shapes or other geometric shapes associated with corresponding geometric centers that may be coded/indexed in any manner set forth in the present patent disclosure. One example implementation may involve defining such ellipsoidal shapes pursuant to 3GPP TS 23.032, incorporated by reference herein. FIG. 6 depicts a representation 600 that illustrates location information pertaining to five reference locations or areas {E1, E2, E3, E4, E5} corresponding to five ellipsoids 608-1 to 608-5, which may be signaled to a UE 606. Similar to the representation 500 of FIG. 5, the optional altitude dimension is not shown in this representation 600 that illustrates only a latitude 604 and a longitude 602. With respect to index-based reporting of locations by UE 606, several arrangements may be obtained similar to the distance criterion set forth above.

In a still further embodiment, the reference location information may be expressed in terms of ephemeris data relative to a satellite constellation, which may be described in accordance with 3GPP 38.821, incorporated by reference hereinabove. In this scenario, the reference location information as well as the UE terminal position may be provided relative to the applicable satellite's ephemeris data. By way of illustration, set forth below is a discussion with respect to an example implementation involving ephemeris data involving commercially available satellite constellations.

In general, key parameters of orbital mechanics (referred to as ephemeris, or ephemerides in plural) of commercial satellites are publicly available from multiple sources. Such information may be used in astronomy and celestial navigation to describe the trajectory of naturally occurring astronomical bodies or objects (e.g., planets) as well as artificial satellites in the sky, i.e., the position and potentially velocity, over time. Typically, ephemeris data may be expressed in an ASCII file using Two-Line Element (TLE) format. The TLE data format encodes a list of orbital elements of an Earth-orbiting object in two 70-column lines. The content of an example TLE table is reproduced below as Tables 5A and 5B.

TABLE 5A

First Line of the Ephemeris (extracted from Table A.1-1 in 3GPP TR 38.821)

| Field | Columns | Content |
| --- | --- | --- |
| 1 | 01-01 | Line number (1) |
| 2 | 03-07 | Satellite number |
| 3 | 08-08 | Classification (U = Unclassified) |
| 4 | 10-11 | International Designator (Last two digits of launch year) |
| 5 | 12-14 | International Designator (Launch number of the year) |
| 6 | 15-17 | International Designator (piece of the launch) |
| 7 | 19-20 | Epoch Year (last two digits of year) |
| 8 | 21-32 | Epoch (day of the year and fractional portion of the day) |
| 9 | 34-43 | First Time Derivative of the Mean Motion divided by two |
| 10 | 45-52 | Second Time Derivative of Mean Motion divided by six (decimal point assumed) |
| 11 | 54-61 | BSTAR drag term (decimal point assumed) |
| 12 | 63-63 | The number 0 (originally this should have been "Ephemeris type") |
| 13 | 65-68 | Element set number. Incremented when a new TLE is generated for this object. |
| 14 | 69-69 | Checksum (modulo 10) |

TABLE 5B

Second Line of the Ephemeris (extracted from Table 1.1-2 in 3GPP TR 38.821)

| Field | Columns | Content |
| --- | --- | --- |
| 1 | 01-01 | Line number (2) |
| 2 | 03-07 | Satellite number |
| 3 | 09-16 | Inclination (degrees) |
| 4 | 18-25 | Right ascension of the ascending node (degrees) |
| 5 | 27-33 | Eccentricity (decimal point assumed) |
| 6 | 35-42 | Argument of perigee (degrees) |
| 7 | 44-51 | Mean Anomaly (degrees) |
| 8 | 53-63 | Mean Motion (revolutions per day) |
| 9 | 64-68 | Revolution number at epoch (revolutions) |
| 10 | 69-69 | Checksum (modulo 10) |

The TLE format may be configured as an expression of mean orbital parameters in a "True Equator, Mean Equinox" format (e.g., using an equatorial coordinate system), filtering out short term perturbations. From a space object's TLE format data, a Simplified General Propagation (SGP) model may be used to calculate the location of the space object revolving about the earth in True Equator Mean Equinox (TEME) coordinates, which can then converted into the ECEF coordinates {x,y,z} in a Cartesian coordinate system as a function of time. The instantaneous velocity at that time can also be obtained thereafter. To represent a location in an example ECEF coordinate system 800, reference is taken to FIG. 8, wherein z-axis 806 points to the true North, while x-axis 802 and y-axis 804 intersect 0° latitude and longitude respectively as illustrated. A satellite location and/or a reference location for a UE terminal, generally shown as location [P{i}] is therefore represented as a {x,y,z} point in the coordinate system 800, wherein $\varphi$ is latitude, $\lambda$ is longitude, "a" is major axis and "b" is minor axis.

An example of ephemeris data converted into ECEF format for the Telestar-19 satellite is shown below as an example:

TABLE 6

Example of Ephemeris converted to ECEF
(Extracted from 3GPP TR 38.821)

| Epoch (day, hr, min, sec) | X[km] | Y[km] | Z [km] | dX/dt [km/s] | dY/dt [km/s] | dZ/dt [km/s] |
|---|---|---|---|---|---|---|
| 2018-10-26 02:00:00.000 | 19151.529 | −37578.251 | 17.682 | −0.00151 | −0.00102 | −0.00106 |
| 2018-10-26 02:05:00.000 | 19151.073 | −37578.556 | 17.359 | −0.00152 | −0.00101 | −0.00109 |
| 2018-10-26 02:10:00.000 | 19150.614 | −37578.855 | 17.029 | −0.00154 | −0.00099 | −0.00112 |
| 2018-10-26 02:15:00.000 | 19150.150 | −37579.151 | 16.690 | −0.00155 | −0.00098 | −0.00114 |

Given a specific point in time, accordingly, a satellite's location can be calculated by interpolation. The example given above refers to a GEO/GSO satellite, in which the epoch interval is 5 minutes. For LEO satellites, the intervals may be much shorter, on the order of seconds.

It should be appreciated that regardless of whether a list of reference locations for a UE terminal indexed/coded as ECEF coordinates based on the conversion of corresponding {Latitude; Longitude} pairs, or referenced relative to one or more satellites' ephemeris data, a set of {P(i)} locations may be signaled to the UE terminal, which may employ a position conditionality based on a suitable or configurable distance metric, e.g., to describe a volume, as a reporting criterion in order to determine a subset thereof. Where multiple satellites' ephemeris data is utilized, the indexed reference locations or areas may be defined or identified in certain helpful ways, e.g., as "under satellite beam A"; "under coverage of beam A and beam B edge area", and the like, which may be advantageous in handling handover and/or camping situations.

Figure 7:
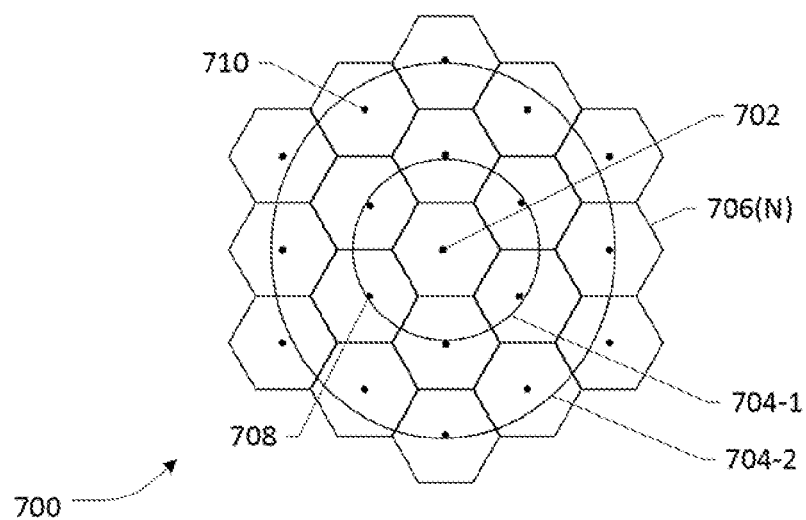
Figure 8:
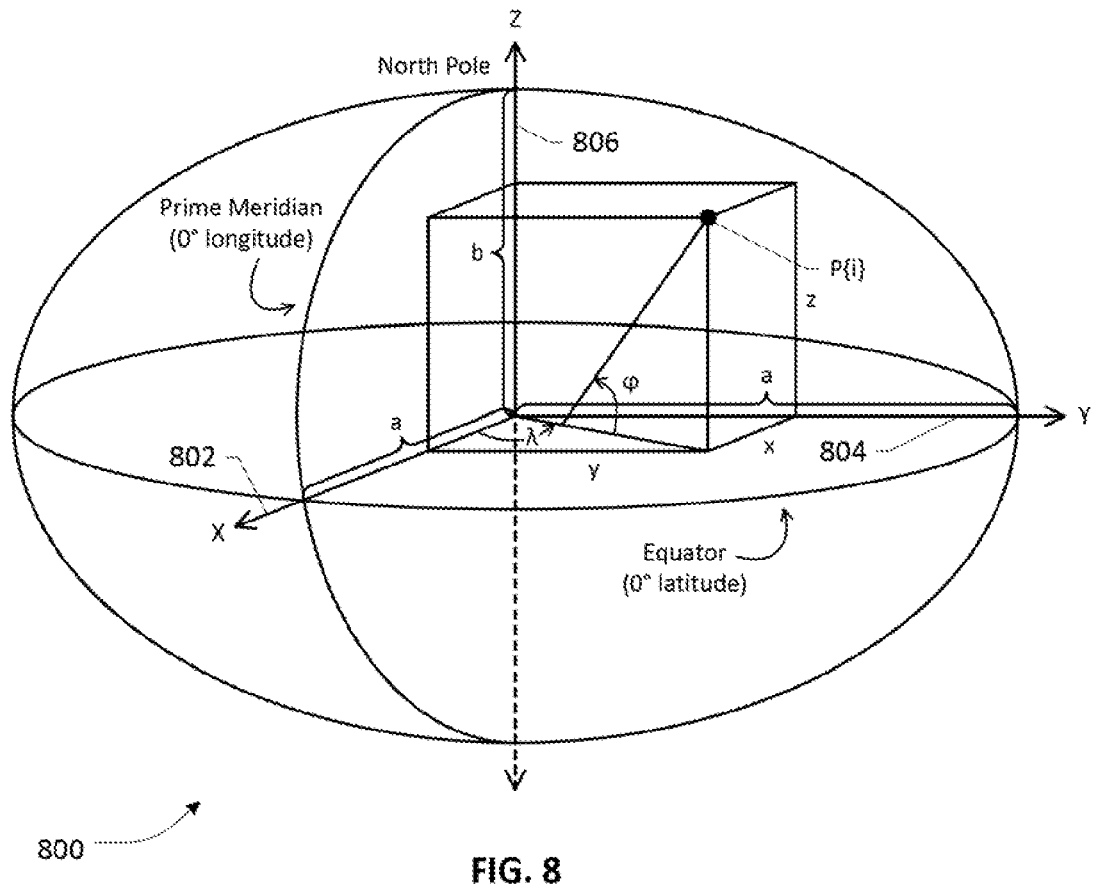

In yet another embodiment, a network node may be configured to signal one or more parameters to a UE terminal for a function or a mathematical relationship that generates a set of indexed reference locations when executed by a suitable module or block at the UE terminal. It should be appreciated that the network signaling may be substantially reduced in this embodiment since the network node only needs to signal function parameters describing how to generate the reference location list. In one example implementation, the network may just indicate one initial reference location point plus one or more distance metrics, e.g., a radius, that describe an area or region, as a level variable that describes a geographical boundary condition for limiting the number of potential reference locations enclosed within. In one example implementation, the UE terminal may be configured to calculate or otherwise determine a set of potential reference location points within the region defined by the distance metrics with respect to the initial reference point, and obtain an indexed list of the reference locations that satisfy a boundary level. In one arrangement, the reference location points may be indexed according to a predefined pattern. Taking reference to FIG. 7, shown therein is a representation mapping 700 where an initial reference location point 702 is illustrated with respect to an area defined by a radius {r}, along with a plurality of levels, e.g., 704-1, 704-2. It should be noted that the area defined by the radius (or any other distance metrics such as length and width, etc.) may comprise a plurality of satellite cells, macro PLMN cells, micro cells, etc., e.g., cells 706(N). Applying a first level 704-1 may result in a first number of reference locations that are within the boundary condition defined by the first level, e.g., location 708. Likewise, applying a second level 704-2 may result in a second number of reference locations that are within the boundary condition defined by the second level, e.g., location 710. Skilled artisans will recognize that a number of variations and modifications may be obtained with respect to the foregoing scheme depending on implementation, e.g., relating to configuring suitable functional/mathematical relations for generating potential reference location points, determining applicable geographic area(s), applicable levels, and the like.

In some arrangements, any location-based information, reference locations relative to a location on earth or relative to one or more satellite beam locations, etc. may be transmitted between the UE terminal and the network node via an application layer or via a Non-Access Stratum (NAS) functionality operating at the network layer level of the OSI protocol. Further, as previously noted, the network node may be provided with varying degrees of functionality and intelligence regarding how a list of indexed reference locations may be constructed. Additionally, depending on implementation, an example network node may be configured with suitable service logic for determining how often a reference location list may be transmitted via one or more ADL channels. For example, the network node may in one implementation determine to send applicable reference location lists more often to UE terminals that are estimated/expected to be closer to a cell border than to UE terminals estimated/expected to be closer to a cell center. With respect to receiving a response control message from a UE terminal (e.g., containing an index, a location report and/or an update thereof), several variations may be implemented depending on how the triggering/reporting criteria are configured. In a relatively simple implementation where a UE terminal is signaled with a list of reference locations and a reporting criterion based a distance threshold from a network node, the reporting can comprise the index corresponding to the closest reference location, or the indices corresponding to a configurable number (N) of closest reference locations, e.g., as set forth previously in reference to the embodiment of FIG. 5. When the UE terminal reports a list of N indices, they may be sorted by the distances between the N reference locations and the UE terminal location. In one arrangement, the parameter N can be configured by a serving NTN node, the UE terminal, or by another network element. In another embodiment, an example UE terminal may also be configured to signal the distance to its closest or N closest reference location points.

Where a UE terminal is signaled with a list of reference locations comprising ellipsoids, e.g., as set forth in FIG. 6 described above, the UE terminal can be configured to include the indices of the ellipsoids within which the UE terminal is located, e.g., indices {E1, E4} corresponding to ellipsoids 608-1 and 608-4, respectively. In case the UE terminal is not located within any of the ellipsoids, the UE terminal can be triggered to report a null index. Upon reception of the null index, the network node may signal a new list to the UE terminal. Such a treatment of null index reports is also generally applicable, mutatis mutandis, in any situation regardless of how the index-based location data is transmitted or signaled to the UE terminal. In another embodiment, an example UE location report content may comprise its actual GNSS location, responsive to a criterion or requirement signaled by the network, e.g., when high location precision is required at the network. It should be appreciated that conditionalities may be network-configurable, or predefined by rules, and/or may be dependent on UE terminal capabilities and its service functionalities requiring the location information with high precision. For example, typical GNSS receivers can estimate their position with a precision of ±1.0 meter or less depending on the number of visible GNSS satellites and the signal quality, although such level of precision is usually not needed for NTN mobility procedures. In another embodiment, a UE terminal can therefore be configured to report its measured position with reduced precision in order to save precious UL resources.

In yet another embodiment, an example UE terminal may be configured to update a current location index (e.g., based on earth fixed reference locations or satellite fixed reference locations) when the UE terminal enters within a configurable area of another reference location, which may be implemented in a manner similar to providing a tracking area update. Such an implementation may be advantageous since the arrangement would help the network node to, e.g., configure measurements accordingly as needed depending on where the UE terminal is located within a large satellite beam, which may span several hundred kilometers in some deployments. An example UE terminal may therefore not need to be configured with Radio Resource Management (RRM) measurements while disposed in the middle of a spot beam. On the other hand, as the UE terminal approaches the satellite's spot beam edge, more frequent RRM measurements may be needed.

In addition to the configurability of the content of a UE location report, various UE triggering criteria can be configured for a UE terminal with respect to when such reports are generated and/or transmitted, which may be signaled by the network node, or locally configured on the device depending on implementation, or by way of other network elements. In one embodiment, a UE terminal may be configured to report the index (or indices) periodically or as a response to event-based triggering. For example, the trigger event can be when the UE terminal approaches closer to another reference location than to the reference location(s) reported in the latest/current or most recent report. As another example, the UE terminal can be triggered to report when it enters or leaves a certain area of a reference location as set forth in any of the embodiments described herein.

In some other example embodiments, the triggering criteria may comprise a timing parameter e.g., a configurable time period T that defines how long a UE terminal can or should wait before generating a new index report to the network node. In one implementation, such a timer T can be considered as a "prohibit timer" which starts once the UE terminal is triggered to initiate a report. If the prohibit timer is running, the UE terminal may not initiate a new location report until the expiry of the timer. In some embodiments, the prohibit timer may be stopped by another event, e.g., as an override, when the UE terminal comes closer to another reference location than to the reference location(s) reported in the latest report, in which case the UE terminal may be caused to stop the prohibit timer and initiate a new location report. In some further embodiments, triggering of location information reporting may therefore be tied to or otherwise dependent on where a UE terminal is in relation to a satellite beam coverage area, wherein a UE's location report or update may also indicate specific location area(s) in relation to the satellite spot beam or footprint.

In still further variations, a UE terminal may be configured to generate a location report or any update only when its nearest reference location changes in a given list of indexed locations. The network node may be configured to maintain a location status of the UE terminal as being unchanged (e.g., at least on the level of the reference locations) until the network node receives a new location report or any update. If the network node expects a response from the UE terminal (e.g., within a configurable period of time) and does not receive one, applicable retransmission procedures may be effectuated depending on the protocol. In some further variations, where lists of indexed reference locations are transmitted to the UE terminals via higher OSI layers, non-receipt of responses by a network node may be indicative of more serious issues with the transmission link and the network node may accordingly launch appropriate diagnostic/repair procedures.

A variety of actions may be effectuated by a network node upon receipt of a location report containing index-based location information or any updates thereof, which may be highly implementation-specific as previously alluded to. For example, the network node (or nodes) may be configured to update the UE location based on the UE index report. Additionally/alternatively or optionally, UE location can be used to signal a handover command to a new satellite cell, to another space/airborne platform, to a TN cell, or to select what cells that should be used for paging, and the like, as set forth in reference to FIG. 3 above.

In an example implementation, location indices information or a list containing index-based locations may be transmitted between UE terminals and serving network nodes via separate control messages or may be included in other messages that can be extended or modified to carry such information as previously noted. For example, control messages configured to carry measurement reporting information when a normal or routine measurement event based on radio conditions is triggered may be modified or otherwise extended to carry the index-based location updates or lists. In some embodiments, a UE location report can also be included in UE assisting information messaging, wherein a UE terminal sends an assisting message when the UE terminal enters a next reference location area. In still further embodiments, a location report and/or update may be included in a UE response that may be generated in response to a specific request message from the network node requesting the UE terminal to provide such information. In such a scenario, an example response embodiment may be location history, and/or current location, and/or planned locations, inter alia. In still further embodiments, index-based location reports and/or any updates thereof may be included in Radio Resource Control (RRC) messages, e.g., RRC Configuration Complete, Reject, etc.

With respect to effectuating idle-mode UE tracking and/or paging for purposes of some embodiments, a terminal may be configured to obtain a list of reference locations and a distance threshold $D_{TH}$ for tracking area updates when it attaches to a serving NTN network. In accordance with one or more embodiments set forth hereinabove, the list of reference locations may be configured to indicate or otherwise include one or more tracking areas where the network expects the UE terminal to be located, e.g., within at least one circular area having a corresponding radius $D_{TH}$ that has a center at a corresponding one of the reference locations. One or more tracking conditionalities may also be configured for the UE terminal depending on implementation. For example, if a distance between the present location of the UE terminal and a reference location in the list is larger than the distance threshold $D_{TH}$, the UE terminal may be required to perform a tracking area update. Otherwise, the UE terminal can travel or roam without performing a tracking area update.

Figure 9:
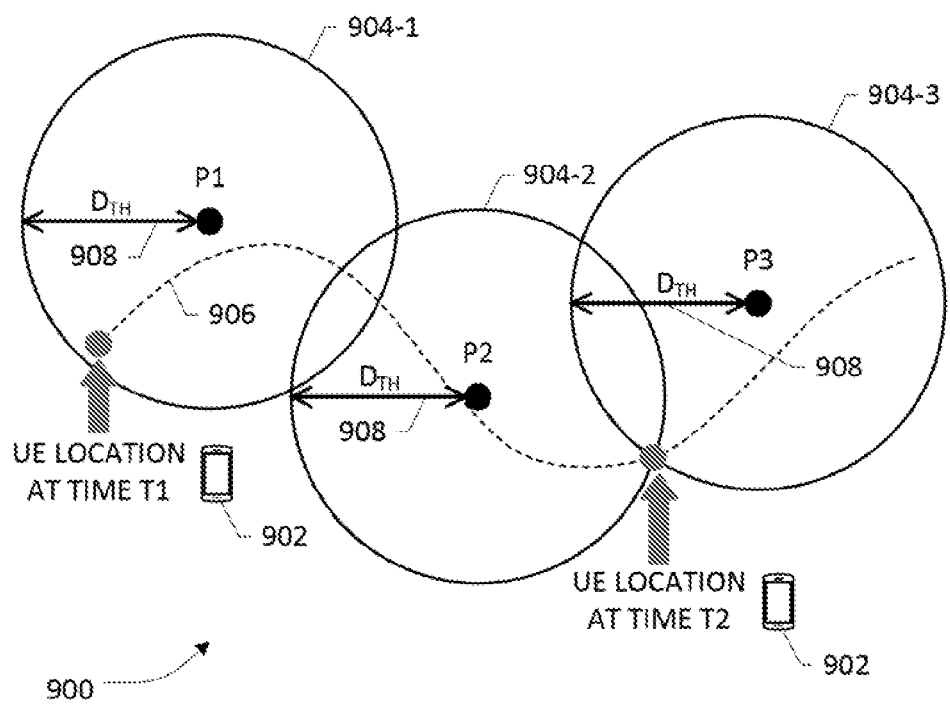
FIG. 9 depicts an illustrative scenario exemplifying idle mode UE tracking in an NTN environment according to an embodiment of the present patent disclosure.

FIG. 9 depicts an illustrative scenario exemplifying tracking of a UE in idle mode disposed in an NTN environment 900 according to an embodiment of the present patent disclosure. By way of example, an initial list of reference locations {P1, P2} is provided to a UE 902 that is located within a first area 904-1 at time $T_1$, with a distance threshold $D_{TH}$ 908. Accordingly, UE 902 does not have to transmit a tracking area update as long as it remains within the distance threshold relative to at least one of the two locations {P1} and {P2} as it travels along a trajectory 906 in the area covered by the NTN environment. Trajectory 906 may result from a travel direction and speed associated with UE 902, comprising a path such that UE terminal 902 may not have to send any tracking area updates from time $T_1$ (e.g., when it enters area 904-1) to time $T_2$ (e.g., when it exits area 904-2). From thereon, the distance of the UE location to both {P1} and {P2} is greater than the threshold $D_{TH}$, thereby necessitating transmission of a tracking area update by UE terminal 902 to the serving network node, which may be a satellite, HAPS, or an NTN gateway or other network element (not specifically shown in this FIG.). Upon reception of the tracking area update, the network node may be configured, responsive thereto, to provide UE terminal 902 with a new list of reference locations reflecting the specific details of the UE's movement for more efficient paging. For example, the network can send a new list of reference locations comprising {P2, P3} to UE terminal 902.

In one example embodiment, the tracking area update message may include UE's current location, heading/direction, moving speed, etc. In another embodiment, the tracking area update message may just be a notification that the current list is no longer valid, in which case the network can estimate the UE's location (e.g., based on which cell the tracking area update message is received) and provide a new list accordingly.

In yet another embodiment, UE terminal 902 may be configured to perform one or more periodic tracking area updates even when it is still located within at least one circular area having radius $D_{TH}$ and centered at one of the reference locations in the list. In some arrangements, the reference locations may each have a different or same distance threshold depending on implementation. Regardless of how a distance threshold $D_{TH}$ is configured regarding respective reference locations, however, such a requirement may be implemented in an example implementation so as to ensure that the network is aware that UE terminal 902 is able to communicate. Otherwise, the network may consider or otherwise determine that UE terminal 902 is not able to communicate and may not page it.

Skilled artisans will appreciate that the foregoing tracking/paging scheme is not limited to any specific type of triggering, e.g., the distance-based triggering as exemplified herein, but can also include triggering based on the shape of ellipsoids relating to respective reference locations according to some of the embodiments described above. In such a scenario, an example network node may be configured to signal a list of reference locations and a corresponding set of ellipsoids or any other geometric shapes (or volumes, if the altitude component is also included) to a UE terminal, which would detect when it is outside any of the ellipsoids/shapes defined by the reference location list. In still further example embodiments, the list of reference locations to be used for idle-mode mobility may also be updated by the core network over NAS whenever the UE terminal sends a tracking area update.

Moreover, providing a list of reference locations and index-based positioning/location update information as set forth in the present patent disclosure may also be implemented in conjunction with cell selection and cell reselection in some still further embodiments. It should be appreciated that basic functions for support of idle mode mobility with a tracking area typically comprise idle mode cell selection and reselection procedures. Traditionally, such procedures are based on received signal strength and quality measurements. In case of cell selection, a UE may simply select any cell that offers a signal strength and quality above a minimum threshold. In case of cell reselection, a UE may perform a ranking of neighboring cells and then selects the highest ranked cell. The ranking is often performed based on measured signal strength assisted by a prioritization among the neighboring cells. In an embodiment of the present patent disclosure, a location-based criterion may be added to the cell (re)selection procedures involving NTN cells. For example, a UE terminal may only be permitted to select to camp on a cell that is among a select N closest cells with respect to its current location. In a further variant, the UE may only be permitted to select to camp on a cell that is within a certain distance from the UE. Various other permutations and combinations in conjunction with one or more embodiments set forth hereinabove are also contemplated to be within the scope of the foregoing scheme.

Figure 10:
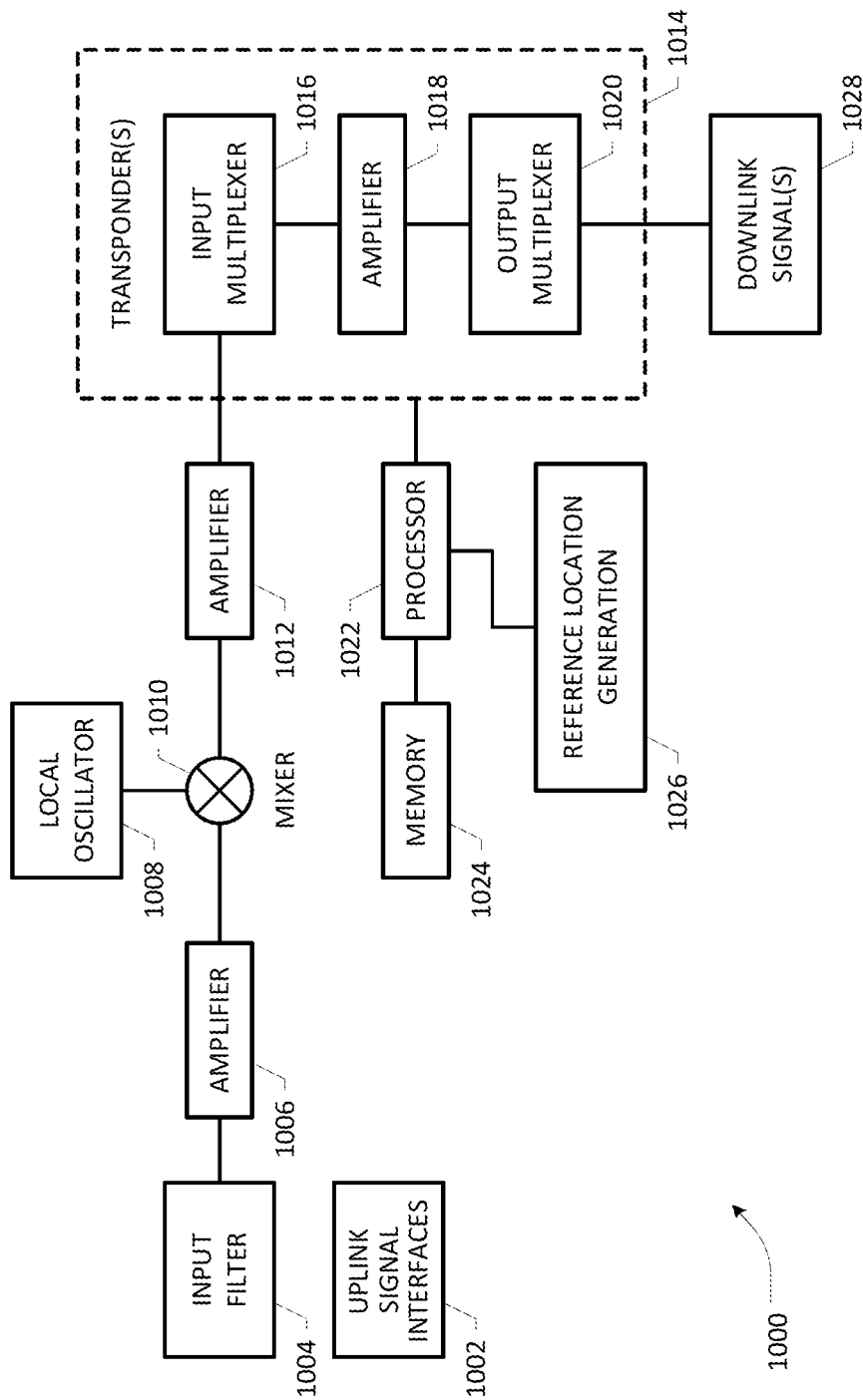
FIG. 10 is a block diagram associated with a communications satellite or a high-altitude platform station according to some embodiments of the present patent disclosure.

FIG. 10 is a block diagram of an apparatus, node, or network element functionality 1000 associated with a space/airborne platform according to some embodiments of the present patent disclosure. A plurality of uplink signal interfaces 1002 and a plurality of downlink signal interfaces 1026 may be provided that are operative with one or more UE terminals and one or more ground stations (e.g., gateways) using any known or heretofore unknown satellite, 3GPP and/or non-3GPP radio communications protocols. Although not specifically shown herein, appropriate network interfaces for effectuating one or more inter-platform communications links may also be provided in some example embodiments. One or more input filters 1004 are operative to filter out uplink signals in select frequency ranges for amplification by amplifier(s) 1006, whose output may be combined by mixer(s) 1010 with signal(s) generated by one or more local oscillators 1008. Combined signals may be amplified by amplifier(s) 1012 operating in select frequency ranges to generate appropriate input signals to one or more transponders 1014, each including an input multiplexer (MUX) 1016, an amplifier 1018 and an output MUX 1020. Depending on the payload functionality and/or deployment, transponders 1014 may be configured as bent pipe or regenerative transponder systems to generate suitable downlink signals in select frequency ranges in some example NTN architectural embodiments described in detail hereinabove. In some embodiments, one or more processors 1022 operating in conjunction with one or more memory modules 1024 may be configured to execute applicable functionalities accordingly, which may include a reference location generation module 1026 for effectuating one or more processes set forth hereinabove. Further, some of the processes may be configured to interoperate with a suitable interworking function (IWF) depending on, for example, the type or level of external/terrestrial network integration being implemented.

Figure 11:
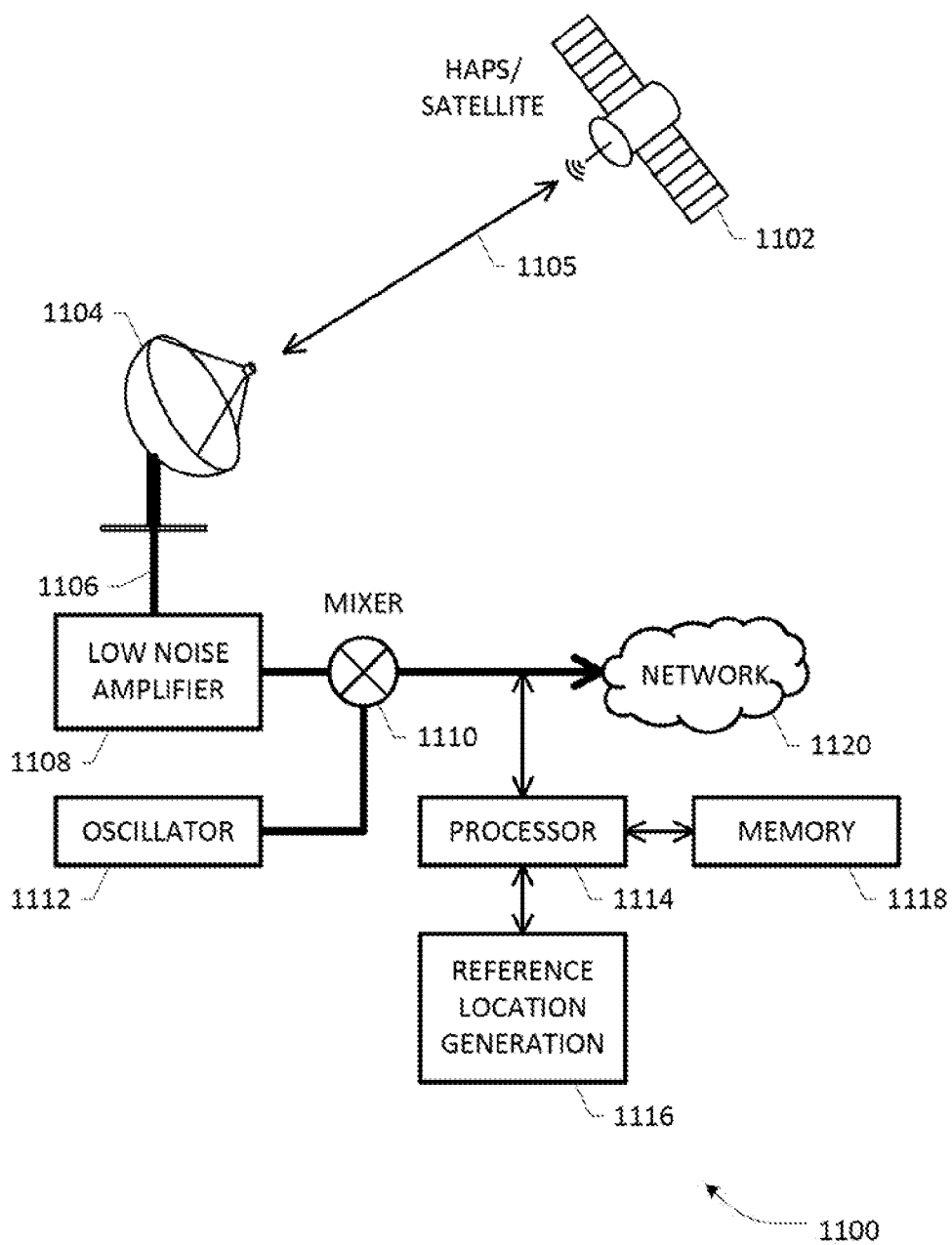
FIG. 11 is a block diagram associated with an NTN gateway according to some embodiments of the present patent disclosure.

FIG. 11 is a block diagram of an apparatus, node, or network element functionality 1100 associated with an NTN gateway according to some embodiments of the present patent disclosure. A gateway antenna system 1104, which may be steerable, is operative to effectuate one or more feeder links 1105 with a space/airborne platform 1102. A waveguide transmission link 1106 coupled to the antenna system 1104 is operative to transmit or receive uplink and downlink signals in respective frequency ranges, wherein the signals are processed using one or more low noise amplifiers 1108, one or more mixers 1110, local oscillators 1112, etc., for interfacing with an external/terrestrial network 1120. Depending on the functionality and/or deployment of space/airborne platform 1102 in accordance with some example NTN architectural embodiments described in detail hereinabove, one or more processors 1114 operating in conjunction with one or more memory modules 1118 may be provided execute applicable functionalities accordingly, which may include a reference location generation module 1116 for effectuating one or more processes set forth hereinabove. In some additional and/alternative embodiments, a suitable interworking function (IWF) may also be provided depending on types of external/terrestrial network integration being implemented.

Figure 12:
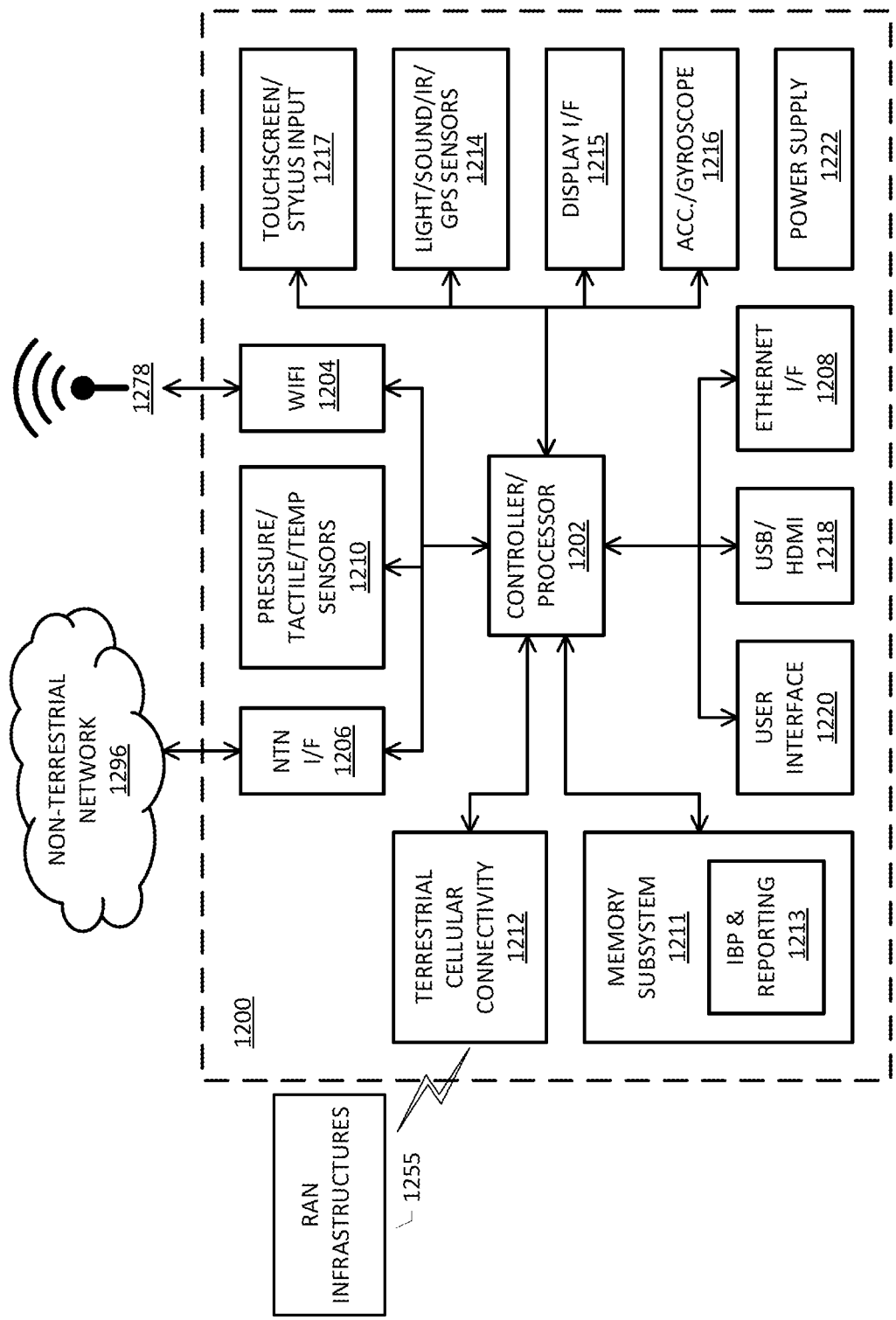
FIG. 12 is a block diagram of a UE according to some embodiments of the present patent disclosure.

FIG. 12 is a block diagram of a UE 1200 according to some embodiments of the present patent disclosure. In general, UE 1200 may be arranged and/or (re)configured to operate as a communications endpoint operative with any known or heretofore unknown satellite, 3GPP and/or non-3GPP radio communications protocols as well as any optionally applicable wireline communications technologies. One or more microcontrollers/processors 1202 are provided for the overall control of UE or terminal 1200 and for the execution of various stored program instructions embodied in a persistent memory 1213 including, e.g., processing of indexed reference locations received from a network node and generation of suitable index-based positioning (IBP) and/or location (IBL) reports as described above. Additional client-side applications may be provided as part of a memory subsystem 1211 of the terminal 1200. Controller/processor complex referred to by reference numeral 1202 may also be representative of other specialty processing modules such as graphic processors, video processors, digital signal processors (DSPs), and the like, operating in association with suitable video and audio interfaces (not specifically shown). Appropriate interfaces such as WiFi I/F modules 1204 and satellite/HAPS network I/F modules 1206 involving tuners, demodulators, descramblers, etc. may be included for processing and interfacing with various short-range wireless and NTN communications infrastructures, e.g., as representatively shown at reference numerals 1278, 1296, respectively. In some embodiments, terminal 1200 may include various types of sensors depending on whether implemented as a tablet, phablet, smartphone, smart wearable, netbook computer, notebook computer, laptop computer, desktop computer, palmtop/handheld computer, IoT device, or as part of an autonomous vehicle, etc. Such sensors may comprise one or more of the following: optical, sound, IR, GPS/GNSS sensors/receivers 1214, accelerometer/inclinometer/gyroscope 1216, as well as pressure, tactile, thermal sensors 1210, etc. Additional sensory instrumentation may comprise gesture sensors/controllers, optical scanners, near-field communications (NFC) devices, head/hand movement detectors, ocular movement trackers, face recognition, and directional sensors such as solid-state compasses. Other I/O or interfaces such as a display interface 1215, touch-screen/stylus input interface 1217, augmented/virtual reality (AR/VR) user interface 1220, USB/HDMI ports 1218, Ethernet I/F 1208, and wide area terrestrial wireless connectivity interfaces 1212 for connecting with suitable RAN infrastructures 1255 are also provided. Although not specifically shown, a local storage may be included for storing one or more index-based location reports, which may require less storage. Terminal 1200 may also include a suitable power supply block 1222, which may comprise AC/DC power conversion to provide power for the various modules and blocks of the device. It should be appreciated that the actual power architecture for terminal 1200 may vary by the hardware platform used, e.g., depending upon the core SoC (System on Chip), memory, analog front-end, analog signal chain components and interfaces used in the specific platform, and the like.

Figure 13:
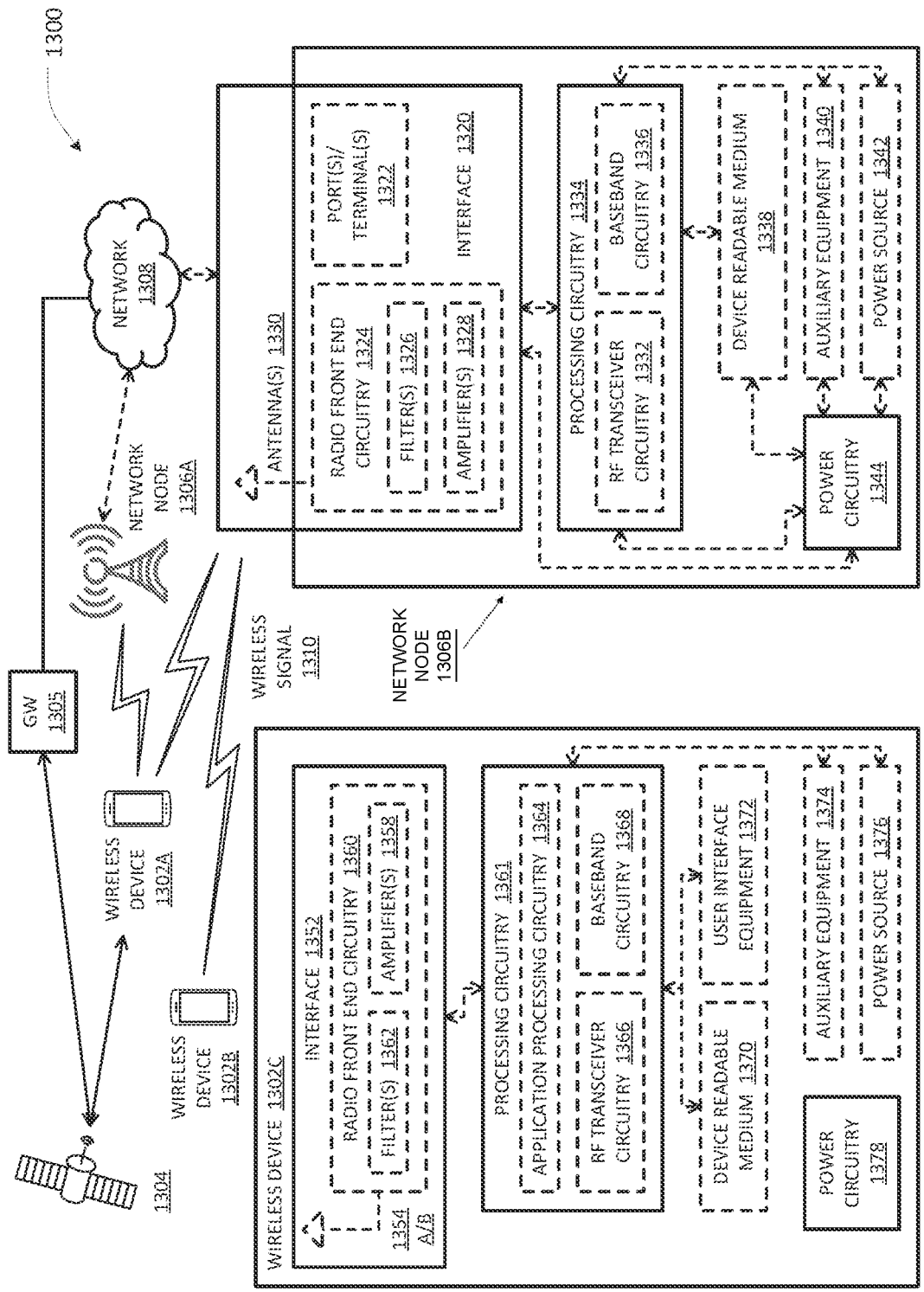
FIG. 13 depicts a representative integrated network environment where additional details regarding one or more UEs and network nodes are exemplified that may be configured for purposes of some embodiments of the present patent disclosure.

Although the embodiments set forth above may be implemented in any appropriate type of network architecture or system using any suitable components, an example integrated network environment 1300 including a wireless network is illustrated in FIG. 13, wherein one or more multi-mode UE terminals are exemplified for communicating with an NTN platform, e.g., one or more satellites/HAPS platforms 1304, one or more wireless networks 1308, or a combination thereof, depending on the availability of satellite coverage, terrestrial cellular coverage, user/operator/service policy management, and the like. For simplicity, example wireless network 1308 is representative of a terrestrial cellular network, which is illustrated in FIG. 13 with only network nodes 1306A/1306B, wireless devices (WDs) or UE terminals 1302A-1302C, any of which may communicate with network nodes 1306A/1306B via suitable wireless signals 1310. In practice, however, a wireless network may further include any additional elements suitable to support communication between wireless devices or between a wireless device and another communication device, such as a landline telephone, a service provider, or any other network node or end device. The wireless network may provide communication and other types of services to one or more wireless devices to facilitate the wireless devices' access to and/or use of the services provided by, or via, the wireless network. Of the illustrated components, network node 1306B and UE/WD terminal 1302C are depicted with additional detail.

The wireless network 1308 may comprise and/or interface with any type of communication, telecommunication, data, cellular, and/or radio network or other similar type of system. In some embodiments, the wireless network 1308 may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards, as previously noted in reference to the network environment 100 of FIG. 1.

At least a portion of network 1308 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1306B and WD/UE terminal 1302C comprise various components described in more detail below. These components work together in order to provide network node and/or wireless device functionality, such as providing wireless connections, in a wireless network. In a different mode (e.g., SATCOM mode), WD/UE terminal 1302C may engage in satellite access connections with the NTN infrastructure 1304/1305 to communicate with the wireless network 1308 via a satellite backhaul. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections as previously noted.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)), as well as NTN gateways with appropriate interworking functionality. Base stations may be categorized based on the amount of coverage they provide (or, stated differently, their transmit power level) and may then also be referred to as femto base stations, pico base stations, micro base stations, or macro base stations, giving rise to different levels of cellular coverage. A base station may be a relay node or a relay donor node controlling a relay. A network node may also include one or more (or all) parts of a distributed radio base station such as centralized digital units and/or remote radio units (RRUs), sometimes referred to as remote radio heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node having virtualized functionalities in a hosted platform in some embodiments. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1306B includes processing circuitry 1334, device readable medium 1338, one or more interfaces 1320, auxiliary equipment 1340, power source(s) 1342, power circuitry 1344, and one or more antennas 1330.

Although network node 1306B illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform at least a portion of the tasks, features, functions and methods disclosed herein when integrated within an NTN environment. Moreover, while the components of network node 1306B are depicted as single blocks located within a larger block, or nested within multiple blocks, in practice, a network node may comprise multiple different physical components that make up a single illustrated component (e.g., device readable medium 1338 may comprise multiple separate hard drives as well as multiple memory modules).

Similarly, network node 1306B may be composed of multiple physically separate components (e.g., a NodeB component and a RNC component, or a BTS component and a BSC component, etc.), which may each have their own respective components. In certain scenarios in which network node 1306B comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1306B may be configured to support multiple radio access technologies (RATs). In such embodiments, some components may be duplicated (e.g., separate device readable medium 1338 for the different RATs) and some components may be reused (e.g., the same antenna 1330 may be shared by the RATs). Network node 1306B may also include multiple sets of the various illustrated components for different wireless technologies integrated into network node 1306B, such as, for example, GSM, WCDMA, LTE, NR, WiFi, or Bluetooth wireless technologies. These wireless technologies may be integrated into the same or different chip or set of chips and other components within network node 1306B.

Processing circuitry 1334 is configured to perform any determining, calculating, or similar operations (e.g., certain obtaining operations) described herein as being provided by a network node. These operations performed by processing circuitry 1334 may include processing information obtained by processing circuitry 1334 by, for example, converting the obtained information into other information, comparing the obtained information or converted information to information stored in the network node, and/or performing one or more operations based on the obtained information or converted information, and as a result of said processing making a determination.

Processing circuitry 1334 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1306B components, such as device readable medium 1338, or any other network node 1306B functionality, which may include NTN-GW or IWF functionality in some integrated network environments. For example, processing circuitry 1334 may execute instructions stored in device readable medium 1338 or in memory within processing circuitry 1334. Such functionality may include providing any of the various wireless features, functions, or benefits discussed herein. In some embodiments, processing circuitry 1334 may include a system on a chip (SOC).

In some embodiments, processing circuitry 1334 may include one or more of radio frequency (RF) transceiver circuitry 1332 and baseband processing circuitry 1336. In some embodiments, RF transceiver circuitry 1332 and baseband processing circuitry 1336 may be on separate chips (or sets of chips), boards, or units, such as radio units and digital units. In alternative embodiments, part or all of RF transceiver circuitry 1332 and baseband processing circuitry 1336 may be on the same chip or set of chips, boards, modules, or units.

In certain embodiments, some or all of the functionality described herein as being provided by a network node, base station, eNB or other such network device may be performed by processing circuitry 1334 executing instructions stored on device readable medium 1338 or memory within processing circuitry 1334. In alternative embodiments, some or all of the functionality may be provided by processing circuitry 1334 without executing instructions stored on a separate or discrete device readable medium, such as in a hard-wired manner. In any of those embodiments, whether executing instructions stored on a device readable storage medium or not, processing circuitry 1334 can be configured to perform the described functionality. The benefits provided by such functionality are not limited to processing circuitry 1334 alone or to other components of network node 1306B, but may be applicable to network node 1306B as a whole, and/or by end users and the wireless network generally.

Device readable medium 1338 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1334. Device readable medium 1338 may store any suitable instructions, data or information, including a computer program, software, an application including one or more of logic, rules, code, tables, etc. and/or other instructions capable of being executed by processing circuitry 1334 and, utilized by network node 1306B. Device readable medium 1338 may be used to store any calculations made by processing circuitry 1334 and/or any data received via interface 1320. In some embodiments, processing circuitry 1334 and device readable medium 1338 may be considered to be integrated.

Interface 1320 may be configured for use in the wired or wireless communication of signaling and/or data between network node 1306B, network 1308, and/or WDs 1302C. As illustrated, interface 1320 comprises port(s)/terminal(s) 1322 to send and receive data, for example to and from network 1308 over a wired connection. Interface 1320 also includes radio front end circuitry 1324 that may be coupled to, or in certain embodiments a part of, antenna 1330. Radio front end circuitry 1324 comprises filters 1326 and amplifiers 1328. Radio front end circuitry 1324 may be connected to antenna 1330 and processing circuitry 1334. Radio front end circuitry may be configured to condition signals communicated between antenna 1330 and processing circuitry 1334. Radio front end circuitry 1324 may receive digital data that is to be sent out to other network nodes or WDs via a wireless connection. Radio front end circuitry 1324 may convert the digital data into a radio signal having the appropriate channel and bandwidth parameters using a combination of filters 1326 and/or amplifiers 1328. The radio signal may then be transmitted via antenna 1330. Similarly, when receiving data, antenna 1330 may collect radio signals which are then converted into digital data by radio front end circuitry 1324. The digital data may be passed to processing circuitry 1334. In other embodiments, the interface may comprise different components and/or different combinations of components.

In certain alternative embodiments, network node 1306B may not include separate radio front end circuitry 1324, instead, processing circuitry 1334 may comprise radio front end circuitry and may be connected to antenna 1330 without separate radio front end circuitry 1324. Similarly, in some embodiments, all or some of RF transceiver circuitry 1332 may be considered a part of interface 1320. In still other embodiments, interface 1320 may include one or more ports or terminals 1322, radio front end circuitry 1324, and RF transceiver circuitry 1332, as part of a radio unit (not shown), and interface 1320 may communicate with baseband processing circuitry 1336, which is part of a digital unit (not shown).

Antenna 1330 may include one or more antennas, or antenna arrays, configured to send and/or receive wireless signals. Antenna 1330 may be coupled to radio front end circuitry 1320 and may be any type of antenna capable of transmitting and receiving data and/or signals wirelessly. In some embodiments, antenna 1330 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multi-Input, Multi-Output (MIMO) configuration. In certain embodiments, antenna 1330 may be separate from network node 1306B and may be connectable to network node 1306B through an interface or port.

Antenna 1330, interface 1320, and/or processing circuitry 1334 may be configured to perform any receiving operations and/or certain obtaining operations described herein as being performed by a network node. Any information, data and/or signals may be received from a wireless device, another network node and/or any other network equipment. Similarly, antenna 1330, interface 1320, and/or processing circuitry 1334 may be configured to perform any transmitting operations described herein as being performed by a network node. Any information, data and/or signals may be transmitted to a wireless device, another network node and/or any other network equipment.

Power circuitry 1344 may comprise, or be coupled to, power management circuitry and is configured to supply the components of network node 1306B with power for performing the functionality described herein. Power circuitry 1344 may receive power from power source 1342. Power source 1342 and/or power circuitry 1344 may be configured to provide power to the various components of network node 1306B in a form suitable for the respective components (e.g., at a voltage and current level needed for each respective component). Power source 1342 may either be included in, or external to, power circuitry 1344 and/or network node 1306B. For example, network node 1306B may be connectable to an external power source (e.g., an electricity outlet)

via an input circuitry or interface such as an electrical cable, whereby the external power source supplies power to power circuitry 1344. As a further example, power source 1342 may comprise a source of power in the form of a battery or battery pack, which is connected to, or integrated in, power circuitry 1344. The battery may provide backup power should the external power source fail. Other types of power sources, such as photovoltaic devices, may also be used.

Alternative embodiments of network node 1306B may include additional components beyond those shown in FIG. 13 that may be responsible for providing certain aspects of the network node's functionality, including any of the functionality described herein and/or any functionality necessary to support the subject matter described herein. For example, network node 1306B may include user interface equipment to allow input of information into network node 1306B and to allow output of information from network node 1306B. This may allow a user to perform diagnostic, maintenance, repair, and other administrative functions for network node 1306B.

As used herein, a WD or terminal may refer to a device capable, configured, arranged and/or operable to communicate wirelessly with network nodes, other wireless devices and/or NTN nodes/platforms. Unless otherwise noted, the term WD may be used interchangeably herein with user equipment (UE) or terminal as noted elsewhere in the present patent disclosure. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Further elaborating on the description set forth elsewhere in the present patent disclosure, examples of a WD may include, but are not limited to, a smartphone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart sensor device, a wireless customer-premise equipment (CPE). a vehicle-mounted wireless terminal device, and the like. A WD may support device-to-device (D2D) or machine-to-machine communications, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC (machine type communications) device. As one particular example, the WD may be a UE implementing the 3GPP narrow band IoT (NB-IoT) standard. Still further examples of such machines or devices are sensors, metering devices such as power meters, industrial machinery, or home or personal appliances (e.g. refrigerators, televisions, etc.), smart personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, WD 1302C includes one or more antennas 1354A/B, interface(s) 1352, processing circuitry 1361, device readable medium 1370, user interface equipment 1372, auxiliary equipment 1374, power source(s) 1376 and power circuitry 1378. WD 1302C may include multiple sets of one or more of the illustrated components for different wireless technologies supported by WD 1302C, such as, for example, GSM, WCDMA, LTE, NR, WiFi, WiMAX, or Bluetooth wireless technologies, just to mention a few. These wireless technologies may be integrated into the same or different chips or set of chips as other components within WD/UE terminal 1302C.

Antenna 1354A/B may include one or more antennas or antenna arrays, configured to send and/or receive wireless signals, and is connected to interface 1352. In certain alternative embodiments, antenna 1354A/B may be separate from WD 1302C and be connectable to WD 1302C through an interface or port. Antenna 1354A/B, interface 1352, and/or processing circuitry 1361 may be configured to perform any receiving or transmitting operations described herein as being performed by a WD. Any information, data and/or signals may be received from a network node and/or another WD. In some embodiments, radio front end circuitry and/or antenna 1354A/B may be considered an interface.

As illustrated, interface 1352 comprises radio front end circuitry 1360 and antenna 1354A/B. Radio front end circuitry 1360 comprises one or more filters 1362 and amplifiers 1358. Radio front end circuitry 1360 is connected to antenna 1354A/B and processing circuitry 1361, and is configured to condition signals communicated between antenna 1354A/B and processing circuitry 1361. Radio front end circuitry 1360 may be coupled to or a part of antenna 1354A/B. In some embodiments, WD 1302C may not include separate radio front end circuitry 1360; rather, processing circuitry 1361 may comprise radio front end circuitry and may be connected to antenna 1354A/B. Similarly, in some embodiments, some or all of RF transceiver circuitry 1366 may be considered a part of interface 1352. Radio front end circuitry 1360 may receive digital data that is to be sent out to other network nodes or WDs via a wireless connection. Radio front end circuitry 1360 may convert the digital data into a radio signal having the appropriate channel and bandwidth parameters using a combination of filters 1362 and/or amplifiers 1358. The radio signal may then be transmitted via antenna 1354A/B. Similarly, when receiving data, antenna 1354A/B may collect radio signals which are then converted into digital data by radio front end circuitry 1360. The digital data may be passed to processing circuitry 1361. In other embodiments, the interface may comprise different components and/or different combinations of components.

Further elaborating on the description set forth elsewhere in the present patent disclosure, processing circuitry 1361 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1302C components, such as device readable medium 1370, as well as any specific WD 1302C functionality not specifically mentioned herein. Such functionality may include providing any of the various wireless features or benefits discussed herein with respect to effectuating index-based location reporting. For example, processing circuitry 1361 may execute instructions stored in device readable medium 1370 or in memory within processing circuitry 1361 to provide the functionality disclosed elsewhere in the present patent application.

As illustrated, processing circuitry 1361 includes one or more of RF transceiver circuitry 1366, baseband processing circuitry 1368, and application processing circuitry 1364. In other embodiments, the processing circuitry may comprise different components and/or different combinations of components. In certain embodiments processing circuitry 1361 of WD 1302C may comprise a SOC. In some embodiments, RF transceiver circuitry 1366, baseband processing circuitry 1368, and application processing circuitry 1364 may be on separate chips or sets of chips. In alternative embodiments, part or all of baseband processing circuitry 1368 and application processing circuitry 1364 may be combined into one chip or set of chips, and RF transceiver circuitry 1366 may be on a separate chip or set of chips. In still alternative embodiments, part or all of RF transceiver circuitry 1366 and baseband processing circuitry 1368 may be on the same chip or set of chips, and application processing circuitry 1364 may be on a separate chip or set of chips. In yet other alternative embodiments, part or all of RF transceiver circuitry 1366, baseband processing circuitry 1368, and application processing circuitry 1364 may be combined in the same chip or set of chips. In some embodiments, RF transceiver circuitry 1366 may be a part of interface 1352. RF transceiver circuitry 1366 may condition RF signals for processing circuitry 1361.

In certain embodiments, some or all of the functionality described herein as being performed by a WD may be provided by processing circuitry 1361 executing instructions stored on device readable medium 1370, which in certain embodiments may be a computer-readable storage medium. In alternative embodiments, some or all of the functionality may be provided by processing circuitry 1361 without executing instructions stored on a separate or discrete device readable storage medium, such as in a hard-wired manner. In any of those particular embodiments, whether executing instructions stored on a device readable storage medium or not, processing circuitry 1361 can be configured to perform the described functionality. The benefits provided by such functionality are not limited to processing circuitry 1361 alone or to other components of WD 1302C, but may be applicable to WD 1302C as a whole, and/or by end users and the wireless/NTN environment generally.

Processing circuitry 1361 may be configured to perform any determining, calculating, or similar operations (e.g., certain obtaining operations) described herein as being performed by a WD. These operations, as performed by processing circuitry 1361, may include processing information obtained by processing circuitry 1361 by, for example, converting the obtained information into other information, comparing the obtained information or converted information to information stored by WD 1302C, and/or performing one or more operations based on the obtained information or converted information, and as a result of said processing making a determination.

Device readable medium 1370 may be operable to store a computer program, software, an application including one or more of logic, rules, code, tables, etc. and/or other instructions capable of being executed by processing circuitry 1361. Device readable medium 1370 may include computer memory (e.g., RAM or ROM), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1361. In some embodiments, processing circuitry 1361 and at least a portion of device readable medium 1370 may be considered to be integrated.

User interface equipment 1372 may provide components that allow for a human user to interact with WD 1302C. Such interaction may be of many forms, such as visual, audio, tactile, etc. User interface equipment 1372 may be operable to produce output to the user and to allow the user to provide input to WD 1302C. The type of interaction may vary depending on the type of user interface equipment 1372 installed in WD 1302C. For example, if WD 1302C is a smartphone, the interaction may be via a touch screen; if WD 1302C is a smart meter, the interaction may be through a screen that provides usage (e.g., the number of gallons used) or a speaker that provides an audible alert (e.g., if smoke is detected). User interface equipment 1372 may include input interfaces, devices and circuits, and output interfaces, devices and circuits. User interface equipment 1372 is configured to allow input of information into WD 1302C, and is connected to processing circuitry 1361 to allow processing circuitry 1361 to process the input information. User interface equipment 1372 may include, for example, a microphone, a proximity or other sensor, keys/buttons, a touch display, one or more cameras, a USB port, or other input circuitry, similar to the embodiments described hereinabove in reference to FIG. 12. User interface equipment 1372 is also configured to allow output of information from WD 1302C, and to allow processing circuitry 1361 to output information from WD 1302C. User interface equipment 1372 may also include, for example, a speaker, a display, vibrating circuitry, a USB port, a headphone interface, or other output circuitry. Using one or more input and output interfaces, devices, and circuits, of user interface equipment 1372, WD 1302C may communicate with end users, NTN infrastructure, and/or the wireless network, and allow them to benefit from the functionality described herein.

Auxiliary equipment 1374 is operable to provide more specific functionality which may not be generally performed by WDs. This may comprise specialized sensors for doing measurements for various purposes, interfaces for additional types of communication such as wired communications etc. The inclusion and type of components of auxiliary equipment 1374 may vary depending on the embodiment and/or scenario.

Power source(s) 1376 may, in some embodiments, be in the form of a battery or battery pack. Other types of power sources, such as an external power source (e.g., an electricity outlet), photovoltaic devices or power cells, may also be used. WD 1302C may further comprise power circuitry 1378 for delivering power from power source 1376 to the various parts of WD 1302C which need power from power source 1376 to carry out any functionality described or indicated herein. Power circuitry 1378 may in certain embodiments comprise power management circuitry. Power circuitry 1378 may additionally or alternatively be operable to receive power from an external power source; in which case WD 1302C may be connectable to the external power source (such as an electricity outlet) via input circuitry or an interface such as an electrical power cable. Power circuitry 1378 may also in certain embodiments be operable to deliver power from an external power source to power source 1376. This may be, for example, for the charging of power source 1376. Power circuitry 1378 may perform any formatting, converting, or other modification to the power from power source 1376 to make the power suitable for the respective components of WD 1302C to which power is supplied.

Based on the foregoing description, it will be apparent that at least some embodiments set forth herein are particularly advantageous where an example integration architecture is contemplated between NTN and heterogeneous TN environments regardless of whether UE terminals have advanced GPS/GNSS support capabilities (which may be referred to as "GPS/GNSS terminals") or do not have (which may be referred to as "non-GPS/GNSS terminals"). It should appreciated that besides GPS, the GNSS may also include other satellite navigation systems such as the European Union's Galileo and the BeiDou Navigation Satellite System (BDS) of People's Republic of China (PRC). In such scenarios, GNSS support and position may be used for handover and/or paging decisions in satellite networks, which is due to the radio conditions in satellite networks. However, a constant report of GNSS-location data or location data estimated with a non-GNSS method can cause heavy signaling load to the network. Given the low expected data rates in some SATCOM systems, in particular GEO satellite systems, implementing a design with frequent high-resolution location reporting becomes unfeasible. In particular, uplink reporting for NTN is challenging since UE terminals are more power limited in comparison to the satellite transmit power. At least some of the embodiments herein advantageously overcome the foregoing shortcomings because of the reduced signaling load due to the index-based location reporting scheme of the present disclosure.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a RAM circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

The invention claimed is:

1. A method performed by a network node disposed in a non-terrestrial network (NTN) communications environment, the method comprising:
    sending reference location information to a user equipment (UE) via a service link, wherein the reference location information comprises data pertaining to a plurality of reference locations within one or more coverage areas of the NTN communications environment, each coverage area including a corresponding plurality of spot beam cells, and wherein the reference location information further comprises one of: (i) a list of indices corresponding to the plurality of reference locations, each index coded as a pair of a longitude and a latitude of the corresponding reference location, (ii) a set of ephemeris data corresponding to the plurality of reference locations; and (iii) a set of earth-centered, earth-fixed (ECEF) coordinates corresponding to the plurality of reference locations,
    wherein the data comprises:
        a list of the plurality of reference locations, each identified with a positioning information indicating index; or
        one or more parameters of a function or mathematical relationship for generating the list of reference locations; and
    responsive to sending the reference location information, receiving from the UE a reporting message containing positioning information indicating indices of one or more reference locations of the plurality of reference locations that are determined to satisfy a position criterion relative to a current position of the UE.

2. The method as recited in claim 1, further comprising signaling to the UE one or more report triggering criteria including at least one of: (i) an instruction to the UE to generate the reporting message periodically or in response to an event-based triggering action; (ii) a configurable timer criterion for facilitating determination of one or more time periods in between generating two successive reporting messages; and (iii) an instruction to the UE to generate the reporting message only when one or more indices are determined to be different from indices of an immediately preceding reporting message.

3. The method as recited in claim 1, further comprising performing at least one of following actions responsive to receiving the reporting message from the UE: sending a handover signal to a new spot beam cell to effectuate communications with the UE; selecting one or more spot beam cells for paging the UE; and tracking of the UE in idle mode.

4. The method as recited in claim 1, further comprising receiving, prior to sending the reference location information to the UE, a signaling message from the UE indicating the UE's capability or incapability to support index-based position reporting.

5. The method as recited in claim 1, wherein the plurality of reference locations are obtained based upon at least one or more of: (i) the UE's last known position; (ii) an estimated travel direction and estimated speed of travel associated with the UE; (iii) a geographic boundary condition within which the plurality of reference locations are to be limited; (iv) signaling loads on one or more service links associated with the network node; (v) one or more inter-NTN signals received from another network node relative to the UE's estimated geolocation; and (v) one or more inputs from an intelligent data analytics system associated with the network node configured to estimate the UE's geolocation based on third-party data.

6. The method as recited in claim 5, wherein the position criterion comprises at least one of: (i) determining a pre-configured number of reference locations that are closest to the UE's current position; (ii) determining one or more geographic regions in which the UE's current position is located; and (iii) determining if the UE's geolocation has changed with respect to the indices of the plurality of the reference locations.

7. A network node disposed in a non-terrestrial network (NTN) communications environment, the network node comprising processing circuitry, the processing circuitry configured to:
    send reference location information to a user equipment (UE) via a service link, wherein the reference location information comprises data pertaining to a plurality of reference locations within one or more coverage areas of the NTN communications environment, each coverage area including a corresponding plurality of spot beam cells, and wherein the reference location information further comprises one of: (i) a list of indices corresponding to the plurality of reference locations, each index coded as a pair of a longitude and a latitude of the corresponding reference location, (ii) a set of ephemeris data corresponding to the plurality of reference locations; and (iii) a set of earth-centered, earth-fixed (ECEF) coordinates corresponding to the plurality of reference locations,
    wherein the data comprises:
        a list of the plurality of reference locations, each identified with a positioning information indicating index; or
        one or more parameters of a function or mathematical relationship for generating the list of reference locations; and
    responsive to sending the reference location information, receive from the UE a reporting message containing positioning information indicating indices of one or more reference locations of the plurality of reference locations that are determined to satisfy a position criterion relative to a current position of the UE.

8. The network node as recited in claim 7, wherein the network node is configured as at least one of: (i) a communications satellite disposed in one of a low earth orbit (LEO), a medium earth orbit (MEO), and a geostationary orbit (GEO); (ii) a high-altitude platform station (HAPS) configured for communications, and (iii) an NTN gateway configured to interoperate with a terrestrial communications network.

9. The network node as recited in claim 7, wherein the processing circuitry is further configured to signal to the UE one or more report triggering criteria including at least one of: (i) an instruction to the UE to generate the reporting message periodically or in response to an event-based triggering action; (ii) a configurable timer criterion for facilitating determination of one or more time periods in between generating two successive reporting messages; and (iii) an instruction to the UE to generate the reporting message only when one or more indices are determined to be different from indices of an immediately preceding reporting message.

10. The network node as recited in claim 7, wherein the processing circuitry is further configured to perform at least one of following actions responsive to receiving the reporting message from the UE: send a handover signal to a new spot beam cell to effectuate communications with the UE; select one or more spot beam cells for paging the UE; and track the UE in idle mode.

11. The network node as recited in claim 7, wherein the processing circuitry is further configured to receive, prior to sending the reference location information to the UE, a signaling message from the UE indicating the UE's capability or incapability to support index-based position reporting.

12. The network node as recited in claim 7, wherein the plurality of reference locations are obtained based upon at least one or more of: (i) the UE's last known position; (ii) an estimated travel direction and estimated speed of travel associated with the UE; (iii) a geographic boundary condition within which the plurality of reference locations are to be limited; (iv) signaling loads on one or more service links associated with the network node; (v) one or more inter-NTN signals received from another network node relative to the UE's estimated geolocation; and (v) one or more inputs from an intelligent data analytics system associated with the network node configured to estimate the UE's geolocation based on third-party data.

13. The network node as recited in claim 12, wherein the position criterion comprises at least one of: (i) determining a preconfigured number of reference locations that are closest to the UE's current position; (ii) determining one or more geographic regions in which the UE's current position is located; and (iii) determining if the UE's geolocation has changed with respect to the indices of the plurality of the reference locations.

14. A method performed by a user equipment (UE) disposed in a non-terrestrial network (NTN) communications environment, the method comprising:
receiving reference location information from a network node via a service link associated therewith, wherein the reference location information comprises data pertaining to a plurality of reference locations within one or more coverage areas of the NTN communications environment, each coverage area including a corresponding plurality of spot beam cells, and wherein the reference location information further comprises one of: (i) a list of indices corresponding to the plurality of reference locations, each index coded as a pair of a longitude and a latitude of the corresponding reference location, (ii) a set of ephemeris data corresponding to the plurality of reference locations; and (iii) a set of earth-centered, earth-fixed (ECEF) coordinates corresponding to the plurality of reference locations,
wherein the data comprises:
a list of the plurality of reference locations, each identified with an index; or one or more parameters of a function or mathematical relationship for generating
the list of the plurality of reference locations; and
responsive to receiving the reference location information, generating and transmitting a reporting message to the network node, the reporting message containing positioning information indicating indices of one or more reference locations of the plurality of reference locations that are determined to satisfy a position criterion relative to a current position of the UE.

15. The method as recited in claim 14, further comprising receiving one or more report triggering criteria from the network node, the report triggering criteria including at least one of: (i) an instruction to generate the reporting message periodically or in response to an event-based triggering action; (ii) a configurable timer criterion for facilitating determination by the UE of one or more time periods in between generating two successive reporting messages; and (iii) an instruction to generate the reporting message only when one or more indices are determined to be different from indices of an immediately preceding reporting message.

16. The method as recited in claim 14, further comprising:
monitoring by the UE its geolocation; and
triggering an update to the network node responsive to the monitoring and the one or more triggering criteria, wherein the update includes at least one index different from the indices of the reporting message.

17. The method as recited in claim 14, further comprising sending prior to receiving the reference location information from the network node, a signaling message to the network node indicating the UE's capability or incapability to support index-based position reporting.

18. The method as recited in claim 14, wherein the position criterion comprises at least one of: (i) determining a preconfigured number of reference locations that are closest to the UE's current position; (ii) determining one or more geographic regions in which the UE's current position is located; and (iii) determining if the UE's geolocation has changed with respect to the indices of the plurality of the reference locations.

19. A user equipment (UE) disposed in a non-terrestrial network (NTN) communications environment the UE comprising processing circuitry, the processing circuitry configured to:
receive reference location information from a network node via a service link associated therewith, wherein the reference location information comprises data pertaining to a plurality of reference locations within one or more coverage areas of the NTN communications environment, each coverage area including a corresponding plurality of spot beam cells, and wherein the reference location information further comprises one of: (i) a list of indices corresponding to the plurality of reference locations, each index coded as a pair of a longitude and a latitude of the corresponding reference location, (ii) a set of ephemeris data corresponding to the plurality of reference locations; and (iii) a set of earth-centered, earth-fixed (ECEF) coordinates corresponding to the plurality of reference locations, wherein the data comprises:
- a list of the plurality of reference locations, each identified with an index; or
- one or more parameters of a function or mathematical relationship for generating the list of the plurality of reference locations; and responsive to receiving the reference location information, generate and transmit a reporting message to the network node, the reporting message containing positioning information indicating indices of one or more reference locations of the plurality of reference locations that are determined to satisfy a position criterion relative to a current position of the UE.

20. The UE as recited in claim 19, further comprising an NTN communications interface configured to operate with at least one of: (i) a communications satellite disposed in one of a low earth orbit (LEO), a medium earth orbit (MEO), and a geostationary orbit (GEO); (ii) a high-altitude platform station (HAPS) configured for communications, and (iii) an NTN gateway configured to interoperate with a terrestrial communications network.

21. The UE as recited in claim 20, further comprising one or more terrestrial wireless communications interfaces operative with at least one of: a Global System for Mobile Communications (GSM) radio access network (GRAN) infrastructure, an Enhanced Data Rates for Global System for Mobile Communications (GSM) Evolution (EDGE) network (GERAN) infrastructure, a $3^{rd}/4^{th}/5^{th}$ Generation Partnership Project (3/4/5GPP) network infrastructure, an Integrated Digital Enhanced Network (IDEN) infrastructure, a WiMAX infrastructure, a heterogeneous access network infrastructure, a Code Division Multiple Access (CDMA) network infrastructure, a Universal Mobile Telecommunications System (UMTS) network infrastructure, a Universal Terrestrial Radio Access Network (UTRAN) infrastructure, an All-IP Next Generation Network (NGN) infrastructure, a Long Term Evolution (LTE) infrastructure, an 802.11 class WiFi communications infrastructure, a HiperLAN infrastructure, and a HiperMAN infrastructure.

22. The UE as recited in claim 19, wherein the processing circuitry is further configured to receive one or more report triggering criteria from the network node, the report triggering criteria including at least one of: (i) an instruction to generate the reporting message periodically or in response to an event-based triggering action; (ii) a configurable timer criterion for facilitating determination by the UE of one or more time periods in between generating two successive reporting messages; and (iii) an instruction to generate the reporting message only when one or more indices are determined to be different from indices of an immediately preceding reporting message.

23. The UE as recited in claim 19, wherein the processing circuitry is further configured to:
- monitor by the UE its geolocation; and
- trigger an update to the network node responsive to the monitoring and the one or more triggering criteria, wherein the update includes at least one index different from the indices of the reporting message.

24. The UE as recited in claim 19, wherein the processing circuitry is further configured to send, prior to receiving the reference location information from the network node, a signaling message to the network node indicating the UE's capability or incapability to support index-based position reporting.

25. The UE as recited in claim 19, wherein the position criterion comprises at least one of: (i) determining a pre-configured number of reference locations that are closest to the UE's current position; (ii) determining one or more geographic regions in which the UE's current position is located; and (iii) determining if the UE's geolocation has changed with respect to the indices of the plurality of the reference locations.

* * * * *